US006882765B1

(12) United States Patent
Erickson et al.

(10) Patent No.: US 6,882,765 B1
(45) Date of Patent: Apr. 19, 2005

(54) CONNECTION PROTECTION BETWEEN CLIENTS AND OPTICAL CROSS-CONNECT SWITCHES

(75) Inventors: Kent Erickson, Mountain View, CA (US); Subhashini Kaligotia, Mountain View, CA (US); Rajiv Ramaswami, Sunnyvale, CA (US)

(73) Assignee: XROS, Inc., Santa Clara, CA (US)

( * ) Notice: Subject to any disclaimer, the term of this patent is extended or adjusted under 35 U.S.C. 154(b) by 418 days.

(21) Appl. No.: 09/704,458

(22) Filed: Nov. 1, 2000

Related U.S. Application Data

(60) Provisional application No. 60/200,425, filed on Apr. 28, 2000, provisional application No. 60/186,108, filed on Mar. 1, 2000, provisional application No. 60/170,092, filed on Dec. 10, 1999, provisional application No. 60/170,093, filed on Dec. 10, 1999, provisional application No. 60/170,094, filed on Dec. 10, 1999, provisional application No. 60/170,095, filed on Dec. 10, 1999, and provisional application No. 60/162,936, filed on Nov. 2, 1999.

(51) Int. Cl.[7] .......................... G02B 6/26; H04B 10/03
(52) U.S. Cl. ............................. 385/16; 385/24; 385/15; 385/17; 385/147; 398/17; 398/21; 398/20; 398/36; 398/50
(58) Field of Search ......................... 385/14, 24, 123, 385/147, 15, 16, 17, 18; 398/17, 21, 20, 30, 33, 50, 56, 46

(56) References Cited

U.S. PATENT DOCUMENTS

| | | | |
|---|---|---|---|
| 3,651,392 A | 3/1972 | Frisch et al. ................. | 318/561 |
| 4,365,863 A | 12/1982 | Broussaud | |
| 4,369,523 A | 1/1983 | Seki et al. | |
| 4,437,190 A | 3/1984 | Rozenwaig et al. ........ | 455/600 |
| 4,470,154 A | 9/1984 | Yano ........................... | 455/607 |
| 4,519,670 A | 5/1985 | Spinner et al. .......... | 350/96.15 |
| 4,530,566 A | 7/1985 | Smith et al. ................ | 350/96.2 |
| 4,563,774 A | 1/1986 | Gloge | |
| 4,580,873 A | 4/1986 | Levinson | |
| 4,612,670 A | 9/1986 | Henderson ................... | 455/607 |

(Continued)

FOREIGN PATENT DOCUMENTS

| | | | |
|---|---|---|---|
| EP | 0 674 457 A2 | 9/1995 | |
| EP | A-0 674 457 | 9/1995 | ............... 385/24 X |
| EP | 0721275 A2 | 12/1995 | ............ H04M/3/36 |
| EP | 0752794 A2 | 1/1997 | ........... H04Q/11/00 |
| EP | 0759681 A2 | 2/1997 | ............... 385/24 X |
| EP | 0809384 A2 | 5/1997 | ........... H04L/29/14 |
| EP | 0 802 697 A2 | 10/1997 | ............... 385/24 X |
| EP | 0857000 A2 | 1/1998 | ........... H04Q/11/00 |
| EP | 0 674 457 A3 | 5/1998 | |
| EP | 0 849 906 A2 | 6/1998 | |

(Continued)

OTHER PUBLICATIONS

Types and Characteristics of SDH Network Protection Architectures; ITU–T Recommendation G.841 (10/98).
Optical Networks: A Practical Perspective; Rajiv Ramaswami & Kumar Sivarajan; Morgan Kaufmann Pub. 1998, pp. 152–161.

(Continued)

Primary Examiner—Brian M. Healy
(74) Attorney, Agent, or Firm—Blakely Sokoloff Taylor & Zafman

(57) ABSTRACT

The present invention provides methods, apparatus and systems for protecting connections between optical cross-connect switches and client equipment. A connection failure is detected, signaled, and a switch made by the client equipment and the optical cross-connect switch to a protection connection between them so as to minimize service interruption. An out-of-band channel or an in-band channel can be used to signal the connection failure.

60 Claims, 17 Drawing Sheets

U.S. PATENT DOCUMENTS

| | | |
|---|---|---|
| 4,634,239 A | 1/1987 | Buhrer .................... 350/486 |
| 4,797,879 A | 1/1989 | Habbab et al. |
| 4,817,014 A | 3/1989 | Schneider et al. |
| 4,843,382 A | 6/1989 | Oda et al. |
| 4,856,863 A | 8/1989 | Sampsell et al. |
| 4,859,012 A | 8/1989 | Cohn |
| 4,886,335 A | 12/1989 | Yanagawa et al. |
| 4,897,830 A | 1/1990 | Hill et al. ................... 370/4 |
| 4,903,225 A | 2/1990 | Brost |
| 4,982,446 A | 1/1991 | Lord et al. ............... 455/606 |
| 4,984,238 A | 1/1991 | Watanabe et al. |
| 5,035,482 A | 7/1991 | Ten Berge et al. ...... 350/96.2 |
| 5,037,173 A | 8/1991 | Sampsell et al. |
| 5,157,652 A | 10/1992 | Walker ................... 370/17 |
| 5,216,729 A | 6/1993 | Berger et al. |
| 5,253,274 A | 10/1993 | Janniello et al. ......... 375/121 |
| 5,260,819 A | 11/1993 | Hadjifotiou et al. |
| 5,272,556 A | 12/1993 | Faulkner et al. ......... 359/125 |
| 5,299,044 A | 3/1994 | Mosch et al. ............ 359/110 |
| 5,349,550 A | 9/1994 | Gage |
| 5,355,238 A | 10/1994 | Kight et al. .............. 359/135 |
| 5,359,683 A | 10/1994 | Pan |
| 5,440,654 A | 8/1995 | Lambert, Jr. |
| 5,477,364 A | 12/1995 | Pearson .................. 359/139 |
| 5,485,300 A | 1/1996 | Daley ...................... 359/180 |
| 5,487,120 A | 1/1996 | Choy et al. ................ 385/24 |
| 5,488,862 A | 2/1996 | Neukermans et al. |
| 5,515,361 A | 5/1996 | Li et al. .................... 370/15 |
| 5,521,732 A | 5/1996 | Nishio ..................... 359/120 |
| 5,521,734 A | 5/1996 | Frigo ....................... 359/152 |
| 5,524,153 A | 6/1996 | Laor |
| 5,535,293 A | 7/1996 | Buchin |
| 5,539,328 A | 7/1996 | Mirov et al. |
| 5,570,371 A | 10/1996 | Iga ........................... 370/99 |
| 5,608,735 A | 3/1997 | McCullough et al. |
| 5,629,790 A | 5/1997 | Neukermans et al. |
| 5,629,919 A | 5/1997 | Hayashi et al. .......... 369/112 |
| 5,648,618 A | 7/1997 | Neukermans et al. |
| 5,666,487 A | 9/1997 | Goodman et al. ....... 382/232 |
| 5,694,389 A | 12/1997 | Seki et al. |
| 5,699,463 A | 12/1997 | Yang et al. |
| 5,719,903 A | 2/1998 | Hiben et al. |
| 5,727,098 A | 3/1998 | Jacobson |
| 5,729,527 A | 3/1998 | Gerstel et al. ............ 370/228 |
| 5,745,274 A | 4/1998 | Fatehi et al. ............. 359/187 |
| 5,774,604 A | 6/1998 | McDonald |
| 5,781,537 A | 7/1998 | Ramaswami et al. .... 370/254 |
| 5,793,746 A | 8/1998 | Gerstel et al. ............ 370/228 |
| 5,801,863 A | 9/1998 | Fatehi et al. ............. 359/124 |
| 5,825,877 A | 10/1998 | Dan et al. .................. 380/4 |
| 5,825,949 A | 10/1998 | Choy et al. ................ 385/24 |
| 5,828,476 A | 10/1998 | Bonebright et al. |
| 5,864,643 A | 1/1999 | Pan |
| 5,867,289 A | 2/1999 | Gerstel et al. ............ 359/110 |
| 5,892,606 A | 4/1999 | Fatehi et al. ............. 359/177 |
| 5,900,968 A | 5/1999 | Srivastava et al. ....... 359/341 |
| 5,903,687 A | 5/1999 | Young et al. |
| 5,915,063 A | 6/1999 | Colbourne et al. |
| 5,942,937 A | 8/1999 | Bell |
| 5,960,132 A | 9/1999 | Lin |
| 5,963,350 A | 10/1999 | Hill ...................... 385/24 X |
| 5,970,201 A | 10/1999 | Anthony et al. .......... 385/140 |
| 5,978,113 A | 11/1999 | Kight ....................... 359/110 |
| 6,002,818 A | 12/1999 | Fatehi et al. ............... 385/17 |
| 6,005,993 A | 12/1999 | MacDonald ............... 385/16 |
| 6,008,915 A | 12/1999 | Zyskind .................. 359/110 |
| 6,009,220 A | 12/1999 | Chan et al. ................ 385/24 |
| 6,046,833 A | 4/2000 | Sharma et al. ........... 359/119 |
| 6,047,331 A | 4/2000 | Medard et al. ........... 709/239 |
| 6,061,482 A | 5/2000 | Davis ......................... 385/17 |
| 6,069,924 A | 5/2000 | Sudo et al. |
| 6,072,612 A | 6/2000 | Liou et al. ................ 359/123 |
| 6,081,361 A | 6/2000 | Adams et al. ............ 359/188 |
| 6,097,858 A | 8/2000 | Laor |
| 6,097,859 A | 8/2000 | Solgaard et al. |
| 6,108,311 A | 8/2000 | Ramaswami et al. ...... 370/258 |
| 6,130,876 A | 10/2000 | Chaudhuri ............... 370/228 |
| 6,147,968 A | 11/2000 | De Moer et al. .......... 370/225 |
| 6,148,124 A | 11/2000 | Aksyuk et al. ............ 385/24 |
| 6,160,821 A | 12/2000 | Dölle et al. |
| 6,185,021 B1 | 2/2001 | Fatehi et al. .............. 359/117 |
| 6,188,810 B1 | 2/2001 | Baney ....................... 385/11 |
| 6,188,814 B1 | 2/2001 | Bhalla |
| 6,192,172 B1 | 2/2001 | Fatehi et al. ............... 385/17 |
| 6,195,402 B1 | 2/2001 | Hiramatsu |
| 6,198,571 B1 | 3/2001 | Yang ....................... 359/337 |
| 6,207,949 B1 | 3/2001 | Jackel ...................... 250/227 |
| 6,222,954 B1 | 4/2001 | Riza .......................... 385/18 |
| 6,252,689 B1 | 6/2001 | Sharp ....................... 359/168 |
| 6,272,154 B1 | 8/2001 | Bala et al. ................ 359/341 |
| 6,278,812 B1 | 8/2001 | Lin et al. ................... 385/18 |
| 6,285,809 B1 | 9/2001 | Nir et al. ................... 385/17 |
| 6,295,154 B1 | 9/2001 | Laor et al. |
| 6,301,402 B1 | 10/2001 | Bhalla et al. .............. 385/16 |
| 6,317,530 B1 | 11/2001 | Ford ......................... 385/17 |
| 6,374,008 B1 | 4/2002 | Solgaard et al. ........... 385/17 |
| 6,392,220 B1 | 5/2002 | Slater et al. |
| 6,400,730 B1 | 6/2002 | Latif et al. ............... 370/466 |
| 6,504,963 B1 * | 1/2003 | Fang et al. ................. 385/16 |
| 6,735,390 B1 * | 5/2004 | Prasanna .................... 398/3 |

FOREIGN PATENT DOCUMENTS

| | | | |
|---|---|---|---|
| EP | A-0 849 906 | 6/1998 | .............. 385/24 X |
| EP | A-0 857 000 | 8/1998 | .............. 385/24 X |
| EP | 0938244 A2 | 1/1999 | .......... H04Q/11/00 |
| EP | 0 898 440 A | 2/1999 | |
| EP | 0910138 A1 | 4/1999 | .......... H01S/3/025 |
| EP | 0932069 A1 | 7/1999 | ............ G02F/1/09 |
| EP | A-0 938 244 | 8/1999 | .............. 385/24 X |
| EP | 0953854 A1 | 11/1999 | ........... G02B/6/34 |
| EP | 0994635 A1 | 4/2000 | ........... H01Q/11/04 |
| EP | 0 857 000 A3 | 8/2000 | |
| EP | 1087556 A1 | 3/2001 | .......... H04B/10/21 |
| GB | 2347570 A | 3/1999 | .......... H04J/14/02 |
| WO | WO86/04205 | 7/1986 | .......... H04Q/11/02 |
| WO | WO86/05649 | 9/1986 | .......... H04Q/11/02 |
| WO | WO90/14734 | 11/1990 | ............ H04N/7/22 |
| WO | WO91/01603 | 2/1991 | .......... H04J/14/08 |
| WO | WO95/19689 | 7/1995 | .......... H04Q/11/00 |
| WO | WO97/24822 | 7/1997 | .......... H04B/10/08 |
| WO | WO98/54863 | 5/1998 | .......... H04J/14/02 |
| WO | WO99/13656 | 3/1999 | ............ H04Q/3/52 |
| WO | WO 99/18751 | 4/1999 | |
| WO | WO 99/40738 | 8/1999 | |
| WO | WO 99 40738 A | 8/1999 | .............. 385/24 X |
| WO | WO00/13210 | 9/1999 | .......... G02B/26/08 |
| WO | WO99/48323 | 9/1999 | .......... H04B/10/08 |
| WO | WO99/59272 | 11/1999 | .......... H04B/14/06 |
| WO | WO9963374 | 12/1999 | |
| WO | WO9963531 | 12/1999 | |
| WO | WO9966354 | 12/1999 | |
| WO | WO9967666 | 12/1999 | |
| WO | WO0004671 | 1/2000 | |
| WO | WO0013210 A2 | 3/2000 | |
| WO | WO0013210 A3 | 3/2000 | |
| WO | WO0020899 A3 | 4/2000 | |
| WO | WO0020899 A2 | 4/2000 | |
| WO | WO00/20899 | 4/2000 | .......... G02B/6/26 |
| WO | WO00/30282 | 5/2000 | .......... H04J/14/02 |
| WO | WO00/52865 | 9/2000 | .......... H04J/14/02 |
| WO | WO 0007945 A1 | 2/2001 | |

| | | | | |
|---|---|---|---|---|
| WO | WO01/28136 A1 | 4/2001 | ........... | H04B/10/08 |
| WO | WO0150176 A1 | 7/2001 | | |
| WO | WO0163803 A1 | 8/2001 | | |
| WO | WO0171402 | 9/2001 | | |

OTHER PUBLICATIONS

Optical Networks: A Practical Perspective; Rajic Pamaswami & Kumar Sivarajan; Morgan Kaufmann Pub. 1998, Chapter 10, pp. 423–462.

The Photonic Switch Completes the Much–Vaunted All–Optical Network, Technology Investor, Chad White, Oct. 2000, pp. 28–31.

Operation and Maintenance for an All–Optical Transport Network, Bischoff, et al., 11/96, IEEE Communications Magazine, pp. 136–142.

Free–Space Micromachined Optical Switches with Submillisecond Switching Time for Large–Scale Optical Crossconnects, Lin, et al., 04/98, pp. 525–527.

The Optical Internet A New Network Architecture, Kaufman, et al., pp. 1–13.

All Optical Regeneration, Simon, et al., 2000 IEEE pp. 53–54.

An Economic Analysis for Core Optical Transport Networks, Peter Wong & Mark Yin.

Experimental Study of Internet Stability and Backbone Failures, Craig Labovitz, Abha Ahuja, Farnam Jahanaian, 1999 IEEE, pp. 278–285.

A. Himeno, R. Nagase, T. Ito, K. Kato and M. Okuno; Photonic Inter–Module Connector Using 8x8 Optical Switches for Near–Future Electronic Switching Systems; IEICE Transactions on Communications; E77–B(1994) Feb., No. 2, Tokyo, JP.

Okamoto, S. et al.; "Optical Path Cross–Connect Node Architectures for Photonic Transport Network", Journal of Lightwave Technology, vol. 14, No. 6, Jun. 1996, pp. 1410–1422.

Lin, L.Y. et al.; "Micro–Electro–Mechanical Systems (MEMS) for WDM Optical–Crossconnect Networks", Milcom 1999; IEEE Miltary Communications Conf Proceedings; Atlantic City, NJ Oct. 31–Nov. 3, 1999; pp. 954–957.

Gustaffson, K. & Hok, B., A Batch–Processed Optical Scanner Proc. 12th Nordic Semiconductor, Meeting, Jevnaker (Oslo: Center for Industrial Research) pp. 282–285 (1986).

Gustaffson, K. & Hok, B., Fiberoptic Switching and Multiplexing with a Micromechanical Scanning Mirror, Digest of Technical Papers 4th Int. Conf. on Solid State Sensors and Actuators (Tokyo: Institute of Electrical Engineers of Japan) pp. 212–215 (1987).

Gustaffson, K. & Hok, B., a Silicon Light Modulator, Journal of Physics E. Scientific Instruments 21, pp. 608–605 (1998).

Lin L.Y., et al., Free–Space Micromachined Optical–Switching Technologies and Architectures, OFC/100C '99, Feb. 21–26, 1999.

Lin, L.Y., et al., Free–Space Micromachined Optical–Switching Technologies and Architectures, OFC/100C '99, Feb. 21–26, 1999.

Laor, H., et al., Performance of a 576 x 576 optical cross connect, NFOEC–99.

* cited by examiner

CONNECTION PROTECTION BETWEEN CLIENTS AND OPTICAL CROSS-CONNECT SWITCHES

CROSS REFERENCE TO RELATED APPLICATIONS

This non-provisional U.S. Patent Application claims the benefit of U.S. Provisional Patent Application No. 60/162,936 entitled "OPTICAL CROSSCONNECT WITH OPTICAL TO ELECTRICAL CONVERTERS" filed on Nov. 2, 1999 by inventor Rajiv Ramaswami; and also claims the benefit of U.S. Provisional Patent Application No. 60/170,094 entitled "OPTICAL CROSSCONNECT WITH BRIDGING, TEST ACCESS AND REDUNDANCY" filed on Dec. 10, 1999 by inventors Rajiv Ramaswami and Robert R. Ward; and also claims the benefit of U.S. Provisional Patent Application No. 60/170,095 entitled "OPTICAL CROSSCONNECT WITH LOW-LOSS BRIDGING, TEST ACCESS AND REDUNDANCY" filed on Dec. 10, 1999 by inventors Steven Clark and Rajiv Ramaswami; and also claims the benefit of U.S. Provisional Patent Application No. 60/170,093 entitled "1+1 OPTICAL PROTECTION USING OPTICAL CROSSCONNECT" filed on Dec. 10, 1999 by inventors Rajiv Ramaswami and Robert R. Ward; and also claims the benefit of U.S. Provisional Patent Application No. 60/170,092 entitled "SIGNALING INTERFACE BETWEEN OPTICAL CROSSCONNECT AND ATTACHED EQUIPMENT" filed on Dec. 10, 1999 by inventor Rajiv Ramaswami; and also claims the benefit of U.S. Provisional Patent Application No. 60/186,108 entitled "1:N PROTECTION BETWEEN CLIENTS AND ALL-OPTICAL CROSSCONNECTS" filed on Mar. 1, 2000 by inventors Kent Erickson, Subhashini Kaligotla, and Rajiv Ramaswami; and also claims the benefit of U.S. Provisional Patent Application No. 60/200,425 entitled "OPTICAL CROSSCONNECT SYSTEM" filed on Apr. 28, 2000 by inventors Rajiv Ramaswami, Steve Tabaska, and Robert Ward.

BACKGROUND OF THE INVENTION

Over the last few years, the demand for high-speed communication networks has increased dramatically. In many situations, communication networks are implemented with electrical interconnections. As desired levels of bandwidth and transmission speed for communication networks increase, it will become more and more difficult for electrical interconnections to satisfy these levels.

One difficulty associated with electrical interconnections is that they are sensitive to external electromagnetic interference. More specifically, electromagnetic fields that reside in the vicinity of the interconnection lines induce additional currents, which may cause erroneous signaling. This requires proper shielding, which hampered general heat removal.

Another difficulty is that electrical interconnections are subject to excessive inductive coupling, which is referred to as "crosstalk". To alleviate crosstalk, the electrical interconnections must abide by fundamental rules of circuit routing so that they are set at a distance large enough to prevent neighboring signals from having any adverse effect on each other, which would reduce network performance.

In lieu of electrical, optical interconnections offer a solution: to the difficulties affecting conventional electrical interconnections. For example, optical interconnections are not as susceptible to inductive or even capacitive coupling effects as electrical interconnections. In addition, optical interconnections offer increased bandwidth and substantial avoidance of electromagnetic interference. This potential advantage of optics becomes more important as the transmission rates increase and as the strength of mutual coupling associated with electrical interconnections is proportional to the frequency of the signals propagating over these interconnections.

Albeit local or global in nature, many communications network features electronic switching devices to arbitrate the flow of information over the optical interconnections. Conventional electronic switching devices for optical signals are designed to include a hybrid optical-electrical semiconductor circuit employing photo detectors, electrical switches, optical modulator or lasers. The incoming optical signals are converted to electrical signals, which are amplified and switched for driving the lasers. One disadvantage associated with a conventional electronic switching device is that it provides less than optimal effectiveness in supporting high data transmission rates and bandwidth.

An alternative approach is to develop all optical, scalable cross-connect system, which performs switching operations of light pulses or photons without converting and reconverting signals between the optical domain to the electrical domain. As described below, the subject invention provides an optical, scalable cross-connect system with a variety of features such as redundancy for fault protection and non-intrusive, dedicated test access ports for example.

An important problem faced by network operators is how to reliably connect (i.e. link) various types of network equipment with all-optical equipment such as an all-optical cross connect switch. It is desirable to provide adequate protection so that in the event of a connection failure, service is not lost or substantially interrupted. Protection mechanisms can be employed within the all-optical equipment to increase their inherent reliability. Other protection mechanisms can be employed to increase the reliability of the overall communication system. However, just as important is the optical connections between the network equipment and the all-optical equipment. It is desirable to provide a protection mechanism for the optical connections between the network equipment and the all-optical equipment that differs from the system and the equipment protection mechanisms.

A connection failure can occur in a single link between the connection of the various network equipment and the all-optical network equipment. This may be the case for example if a fiber optic cable is cut or damaged or if a fiber optic cable is unplugged from a port of either the various network equipment and the all-optical equipment. Alternatively, a connection failure can occur in the various network equipment or the all-optical network equipment itself due to a failure in a port of either. This may be the case for example if a component in a port card fails and does not allow a signal to propagate through the all-optical equipment. An exemplary component that might fail in the port card of the various network equipment would be an electrical-to-optical converter or transmitter.

SUMMARY OF THE INVENTION

The present invention is summarized by the claims that follow below.

Briefly, the present invention provides methods, apparatus and systems for protecting connections between optical cross-connect switches and client equipment. A connection failure is detected, signaled, and a switch made to a protection connection between the client equipment and optical cross-connect switch so as to minimize service interruption. An out-of-band channel or an in-band channel can be used to signal the connection failure.

The optical cross-connect switch couples to a network and one or more pieces of client equipment in order to bi-directionally transport optical signals with the network and the client equipment. The optical cross-connect switch includes an optical switch fabric, one or more I/O ports provided by I/O port cards to couple to the client equipment, at least one I/O port provided by an I/O port card to couple to the network, a protection port provided by an extra I/O port card to couple to the client equipment, using a pair of protection links, and a signaling channel to transmit and receive a connection failure signal with the client equipment. The optical switch fabric has optical switches to connect or route optical signals between the network equipment and the client equipment. The one or more I/O ports each couple to the client equipment using a pair of working links. If one port of the one or more working ports has a connection failure, the first optical switch fabric switches the failed connection with the client equipment from the failed working port to the protection port.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which.

Like reference numbers and designations in the drawings indicate like elements providing similar functionality. A letter or prime after a reference number designator represents another or different instance of an element having the reference number designator.

DETAILED DESCRIPTION OF THE INVENTION

Herein, the exemplary embodiments of the present invention relate to a scalable, optical cross-connect switching system. These embodiments are not exclusive; rather, they merely provide a thorough understanding of the present invention. Well-known circuits are not set forth in detail in order to avoid unnecessarily obscuring the present invention.

In the following description, certain terminology is used to describe various features of the present invention. For example, a "module" includes a substrate normally formed with any type of material or materials upon which components can be attached such as a printed circuit board or a daughter card for example. Examples of a "component" include an optical switch, a processing unit (e.g., Field Programmable Gate Array "FPGA", digital signal processor, general microprocessor, application specific integrated circuit "ASIC", etc.), couplers and the like. A "coupler" is a component that performs a bridging operation on an input light signal by splitting that light signal into two or more output light signals. Each module features one or more interfaces to transport information over a link. A "link" is broadly defined as one or more information-carrying mediums that establish a communication pathway such as, for example, optical fiber, electrical wire, cable, bus traces, wireless channels and the like. "Information" is data, address, and/or control in any representative signaling format such as light signals (e.g., light pulses or photons).

The present invention provides methods, apparatus and systems to provide protection against failures between the interconnection of client network equipment and optical cross-connect switching systems.

I. General Architectural Overview

Figure 1:
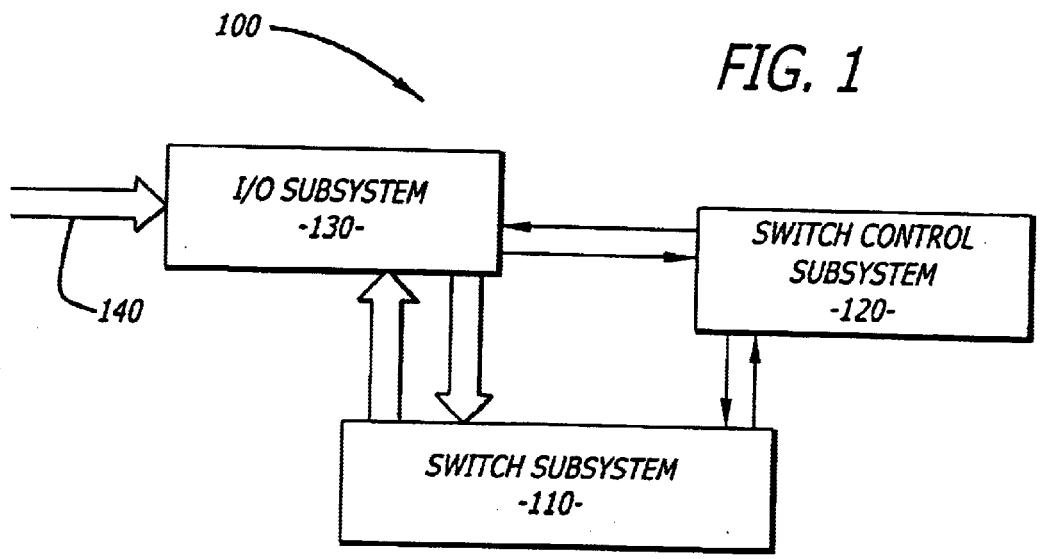
FIG. 1 is a simplified overview of an embodiment of an optical cross-connect switching system.

Referring to FIG. 1, an exemplary embodiment of a simplified overview of an optical cross-connect switching system 100 is shown. Herein, the optical cross-connect switching system 100 comprises three basic units: a switch subsystem 110, a switch control subsystem 120 and an input/output (I/O) subsystem 130. In one embodiment, the modular architecture of the switch subsystem 110, by a method of having replaceable optical switch cores, provides for switch subsystem maintenance in the event of failure within the switch subsystem 110. It is conceivable that further modularity could be achieved by having replaceable subsections within, thus providing for switch matrix maintenance in the event of failure within a switch matrix itself. The modular architecture of both the switch control subsystem 120 and the I/O subsystem 130, each handling a small number of I/O ports in the system 100, provides scalability to the optical cross-connect switching system 100. Thus, additional I/O ports may be subsequently added to the optical cross-connect switching system 100 by adding or removing input/output (I/O) port modules (described below).

The switch subsystem 110 includes optical switches for routing light signals. In one embodiment, the optical switches forming the switch subsystem 110 are micro-machined mirrors; however, it is contemplated that other switch fabrics may be used such as liquid crystal technology: The I/O subsystem 130 receives external light signals 140 and transfers these signals to the switch subsystem 110. The switch control subsystem 120 controls the configuration of the switch subsystem 110 (e.g., mirror orientation) and performs certain monitoring functions. The interconnectivity between the switch subsystem 110, the switch control subsystem 120 and the I/O subsystem 130 includes redundancy so that no equipment failures would cause complete disablement of the system 100.

Figure 2:
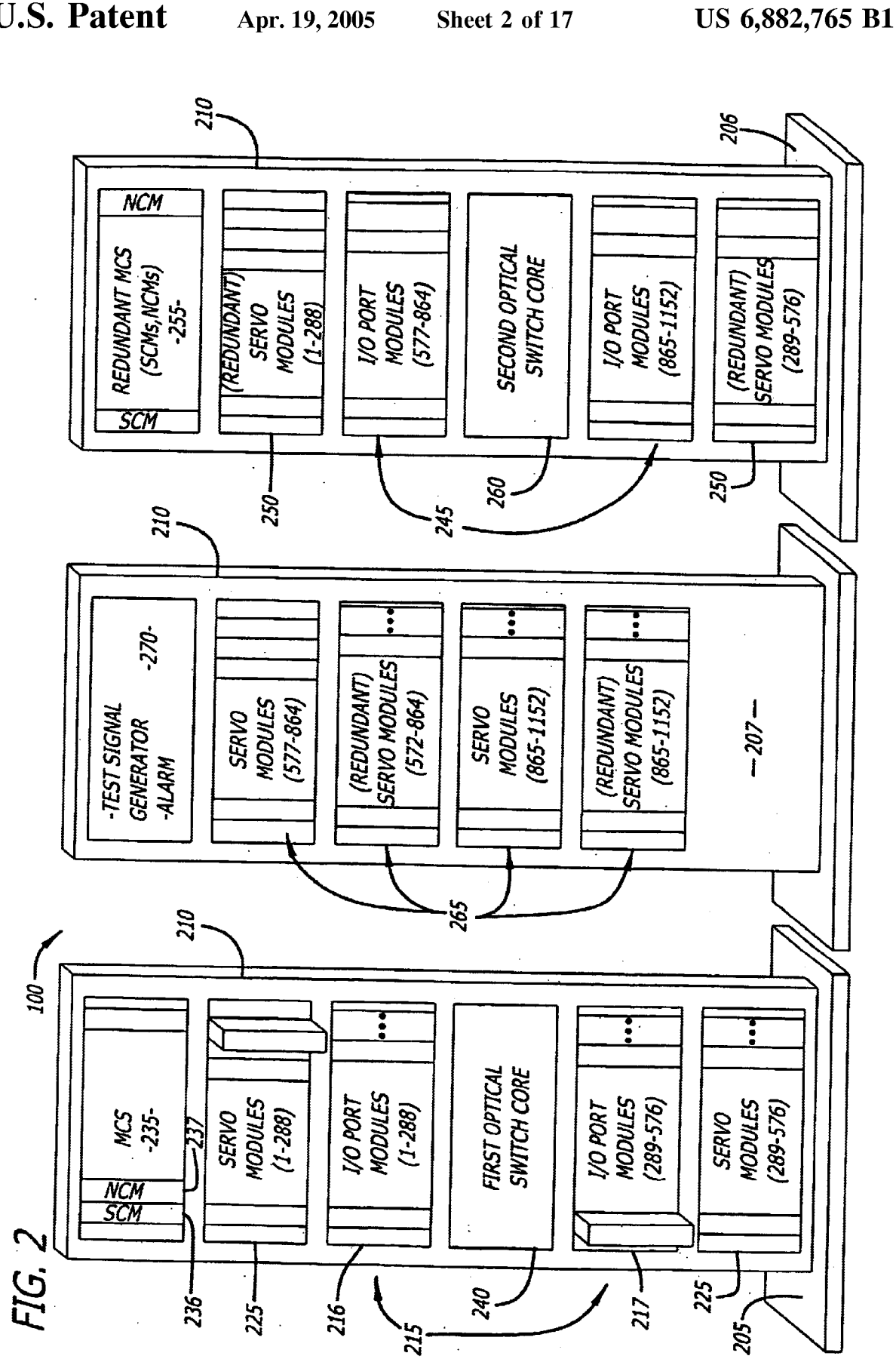
FIG. 2 is a first exemplary embodiment of an optical cross-connect switching system of FIG. 1.

Referring now to FIG. 2, a first exemplary embodiment of an optical cross-connect switching system 100 is shown. In general, the optical cross-connect switching system 100 is a matrix-based optical cross-connect with associated I/O port modules. More specifically, the optical cross-connect switching system 100 is collectively formed by a plurality of platforms 205, 206 and 207 in communication with each other, although the implementation of the switching system 100 as a single platform is another embodiment. Herein, each platform 205, 206 and 207 includes a frame 210 (e.g., a rack) that physically supports I/O port modules forming the I/O subsystem 130 as well as servo modules, servo control modules and/or network control modules of the switch control subsystem 120. The modules are arranged either horizontally or vertically within each platform 205, 206 and 207 and can be individually removed or installed without interfering with immediately adjacent modules. In addition, the frame 210 may also physically support one or more optical switch cores, which may also generally be referred to as "switch fabric," of the switch subsystem 110.

As shown in this embodiment, the first platform 205 comprises (i) a plurality of I/O port modules 215 associated with the I/O subsystem 130 of FIG. 1, (ii) a plurality of servo modules 225 and a management control subsystem (MCS) 235 associated with switch control subsystem 120 of FIG. 1, and (iii) a first (primary) optical switch core 240 associated with switch subsystem 110 of FIG. 1. Similarly, the second platform 206 comprises a plurality of additional I/O port modules 245, a plurality of (redundant) servo modules 250, a management control subsystem 255, and a second (redundant) optical switch core 260. The third platform 207 comprises a plurality of servo modules 265 that control various mirrors of the first and second optical switch cores 240 and 260, which correspond to additional ports associated with I/O port modules 245. Additionally, a light path test signal generator(s), a light path signal monitor(s), circuit breakers and/or alarm visual indication 270 may be located within the third platform 207. For clarity, the elements forming the first platform 205 are described since these elements may be found in the second and/or third platforms 206 and 207.

Figure 3:
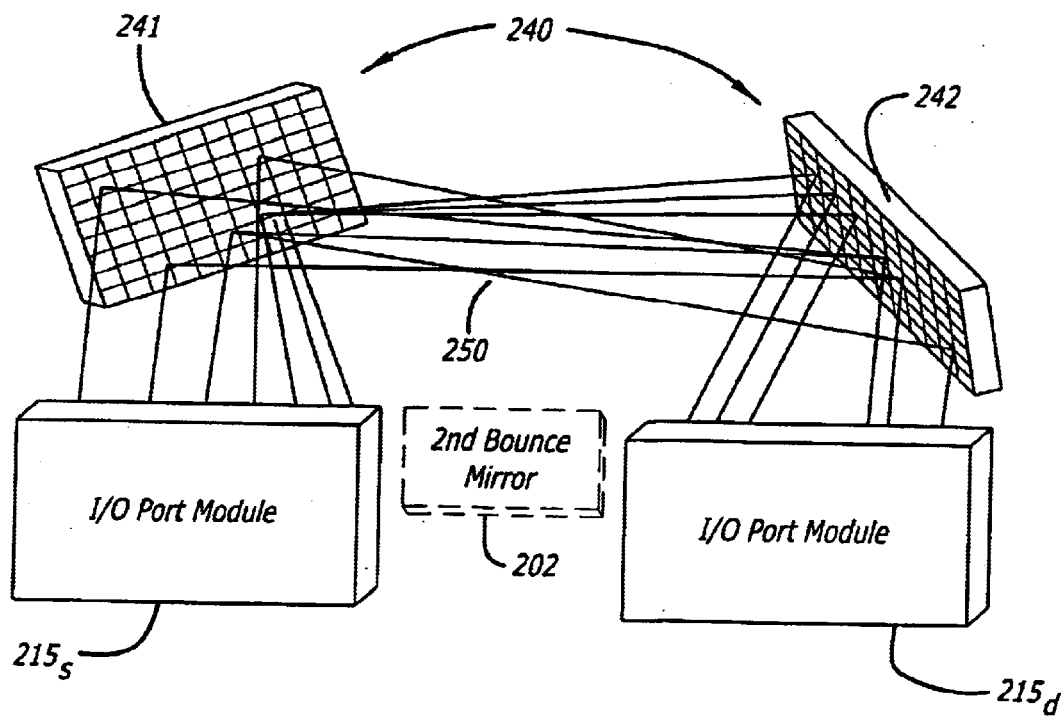
FIG. 3 is an exemplary embodiment of the optical fiber switch matrices forming an optical fiber switch fabric of FIG. 2.
Figure 4:
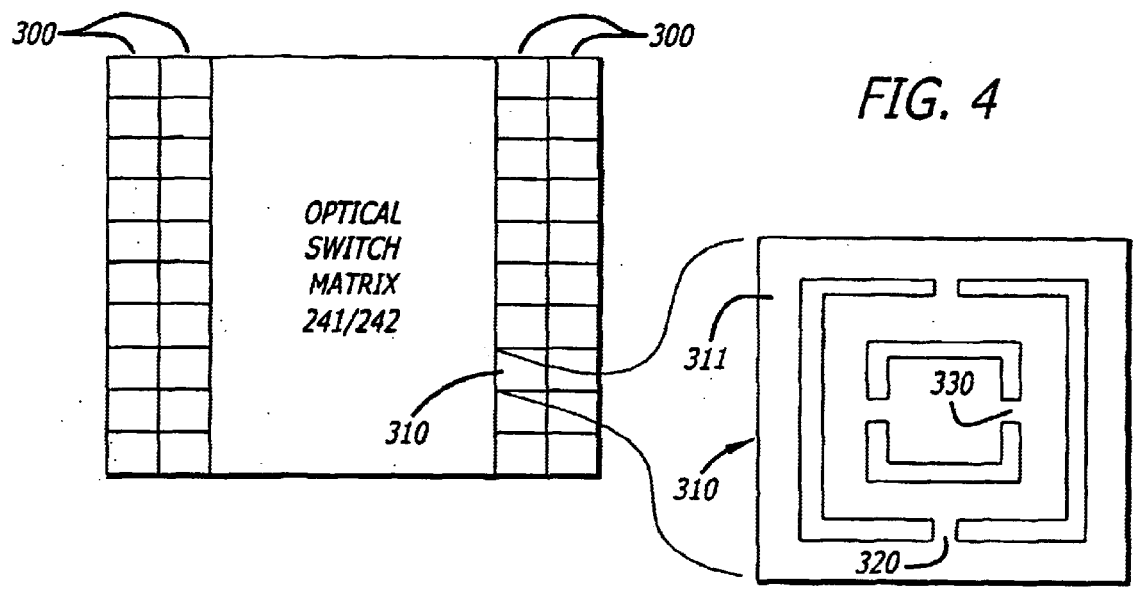
FIG. 4 is an exemplary embodiment of mirror arrays forming an optical fiber switch matrix of FIG. 3.

As shown in both FIGS. 2–4, the first optical switch core 240 includes a first optical switch matrix 241 and a second optical switch matrix 242. These matrices 241 and 242 are collectively positioned to route light signals 250 between a port of a source I/O port module $215_s$ ("s" is a positive whole number) and a port of a destination I/O port module $215_d$ ("d" is a positive whole number), both modules located in any of the platforms 205, 206 and 207 as shown in detail in FIG. 3. Although a two-bounce routing technique is shown, it is contemplated that other light routing techniques may be used including a three-bounce routing technique in which an a second bounce mirror 202 optionally shown in FIG. 3 is positioned to assist in routing light signals from one optical switch matrix to another.

As shown in FIG. 4, one embodiment for each of the optical switch matrices 241 and 242 includes multiple arrays 300 of micro-machined mirrors. Each mirror (e.g., mirror 310) features a mirrored surface 311 and torsional flexures 320 and 330 that enable the mirror 310 to adjust its physical orientation to reflect incoming light signals in any selected direction. Herein, both the first and second optical switch matrices 241 and 242 include Q micro-machined mirrors, where "Q" is less than or equal to the maximum number of I/O ports that can be supported by the optical cross-connect switching system 100. For this embodiment, "Q" is greater than or equal to 64 but less than or equal to 1152 ($64 \leq Q \leq 1152$). However, the present invention is not limited to any maximum number of mirrors or I/O ports. It is contemplated, however, that the number of mirrors employed within the first and second optical switch matrices 241 and 242 may differ.

Figure 6:
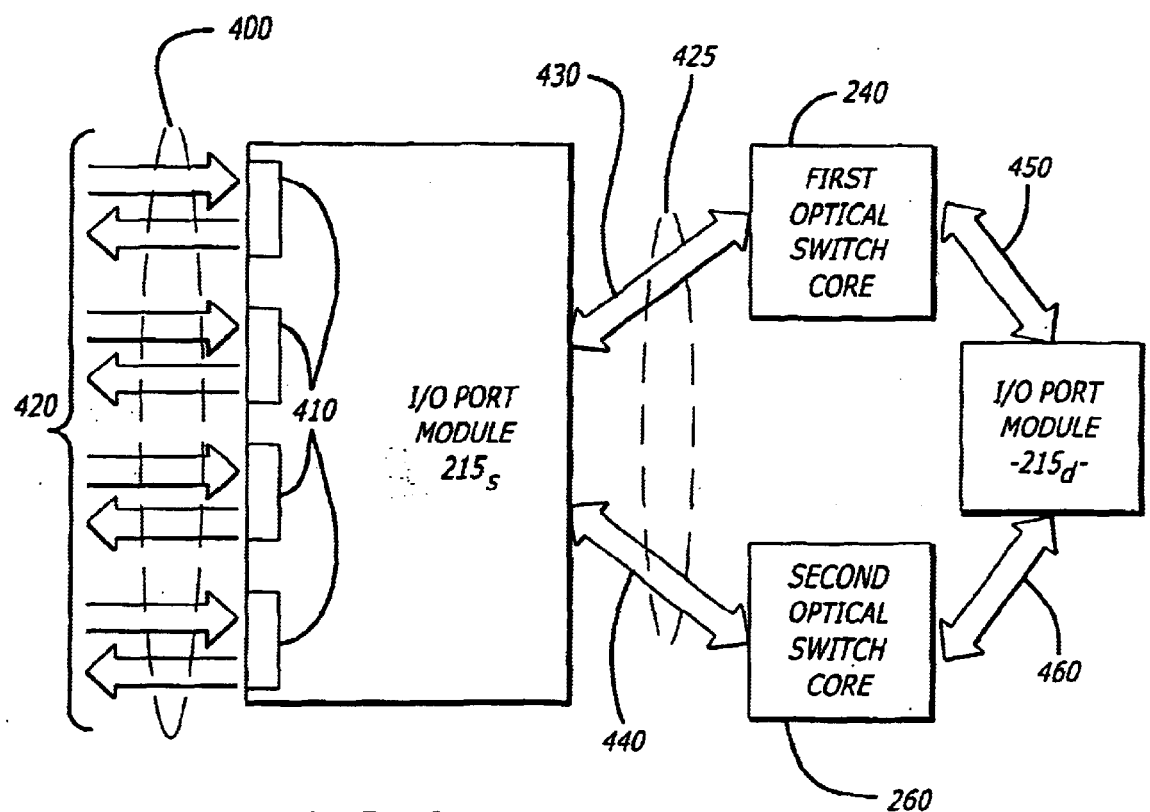
FIG. 6 is an exemplary embodiment of a data path for the transfer of light between I/O port modules and multiple fiber optical switch fabrics of FIG. 2.
Figure 5:
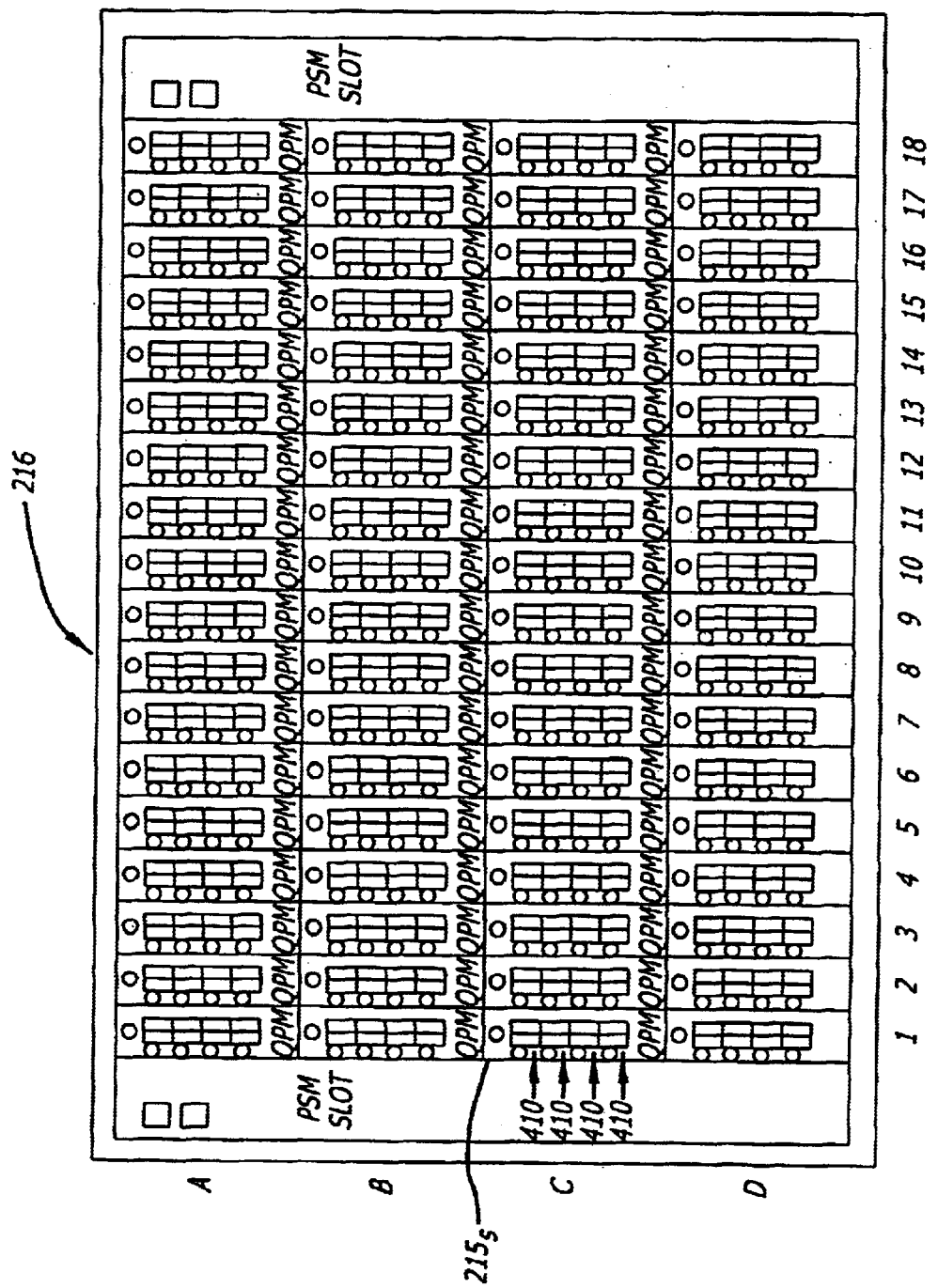
FIG. 5 is an exemplary embodiment of an I/O subsystem featuring a plurality of I/O port modules.

As generally shown in FIGS. 2, 5 and 6, the plurality of I/O port modules 215 features two groups 216 and 217 of I/O port modules. Each group, such as group 216 or 217 for instance, includes up to seventy-two (72) quad-port I/O port modules as shown in FIG. 5 that receive power from one or more power supply modules denoted herein as "PSM". The components forming an I/O port module is described below and shown in FIGS. 8 and 9. Thus, each I/O port module, such as I/O port module $215_s$ for example, features an external interface 400 for a plurality of I/O ports 410 (e.g., four I/O ports). An I/O port 410 features a duplex socket that is adapted to receive a duplex pair of optical fiber links, one optical fiber link routes a light signal to the I/O port 410 while the other routes light signals from the I/O port 410. This support bi-directional optical connections. There is a small percentage (e.g., less than 15%) of these I/O ports, however, that may be assigned as test access ports as described below.

Moreover, as shown in FIG. 6, upon receiving an incoming light signal over an optical fiber link 420, the I/O port module $215_s$ performs a bridging operation by splitting the incoming light signal into multiple (two or more) bridged light signals for routing to the first and second optical switch cores 240 and 260. The bridged light signals are routed through an internal optical interface 425 featuring optical fiber ribbon links 430 and 440. For this embodiment, the "optical fiber ribbon links" are ribbon cables having multiple optical fiber lines (e.g., two lines from each I/O port). The first optical switch core 240 provides a primary optical path. The second optical switch core 260 provides a redundant optical path in the event the first optical switch core 240 is not operating properly. The optical switch cores 240 and 260 route the bridged light signals to a selected port of a destination I/O port module (e.g., I/O port module $215_d$) via optical fiber ribbon links 450 and 460.

Figure 7:
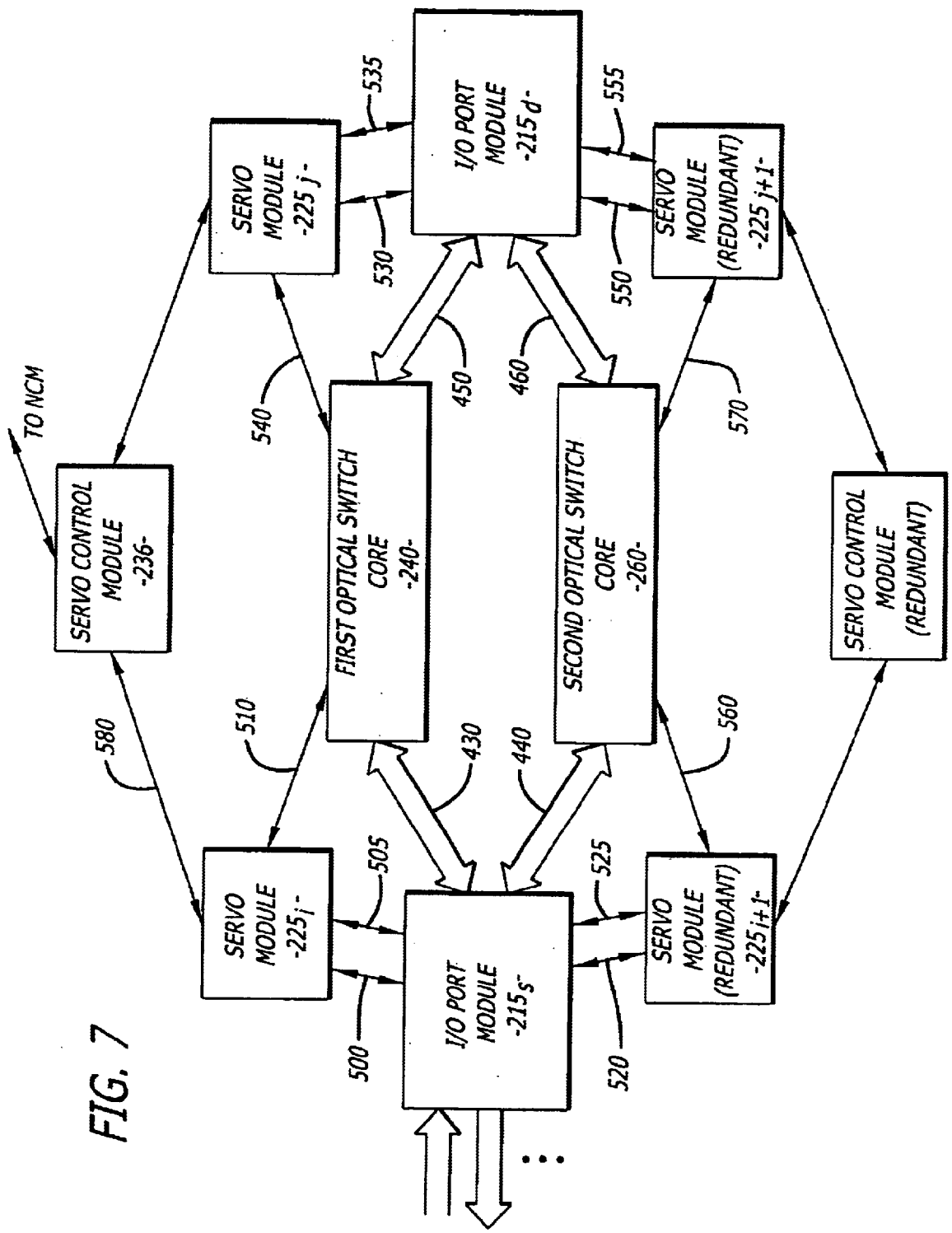
FIG. 7 is an exemplary embodiment of a control path featuring the interconnections between the I/O port module and servo modules.

Upon receiving light signals from both the first and second optical switch cores 240 and 260, the I/O port module $215_s$ provides small percentage optical tap signals of the received light paths to the respective servo modules, which in turn determine light signal quality. The respective servo modules will convey light signal quality for each respective light path to the I/O port module, using a digital protocol over an electrical communication link 505 to the I/O port module as shown in FIG. 7. The I/O port module $215_s$ will in turn, determine (i.e. select) which light signal has the higher signal quality and outputs that signal via interface 400. In most cases, the signal quality of the two light paths presented to the I/O port module will be of the same signal quality and may have a relatively low optical loss of approximately seven decibels (7 dB) or less.

Referring now to FIGS. 2 and 7, each servo module 225 is configured to receive optical tap signals from one or more I/O port modules. Herein, servo module $225_i$ is configured to receive optical tap signals via link 500 from I/O port module $215_s$. These optical tap signals provide feedback to indicate a percentage of the bridged light signals and also allow for light to be injected under certain conditions. In response to receiving optical tap signals via link 500, the servo module $225_i$ provides mirror control signals over link 510 to the first optical switch core 240. The mirror control signals are routed via a unique communication path to an optical switch (e.g., a micro-machined mirror) and are associated with the port of the I/O port module $215_s$ through which the incoming light signal was routed. The mirror control signals are used for proper adjustment of the physical orientation of the mirror.

The I/O port module $215_d$ provides optical tap signals over link 530 to servo module $225_j$. In response to receiving the optical tap signals from I/O port module $215_d$, the servo module $225_j$ provides mirror control signals via link 540 to the first optical switch core 240. The mirror control signals are routed via a unique communication path to a micro-machined mirror associated with a selected port of the I/O port module $215_d$ from which the light signal would be output. Herein, sensing the optical tap (feedback) signals, the servo module $225_j$ determines the light signal quality and conveys light signal quality information for each light path using a digital protocol over (electrical) link 535. Thereafter, the I/O port module 215d chooses the selected port (i.e. port having the best light signal quality).

Collectively, the optical tap signals, mirror control signals and light signal quality information, which are routed over links 500, 510, 530, 540, 505 and 535, are used by servo modules $225_i$ and $225_j$ for adjustment of the physical orientation of mirrors to make a connection between I/O port module $215_s$ and $215_d$. Additionally, I/O port modules $215_s$ and $215_d$ also transfer optical tap signals via links 520 and 550, respectively. Similar to the above description, these optical tap signals establish the redundant optical path by altering the physical orientation of one or more micro-machined mirrors of the second optical switch core 260 using mirror control signals over links 560 and 570 and light signal quality information via links 525 and 555.

Figure 11:
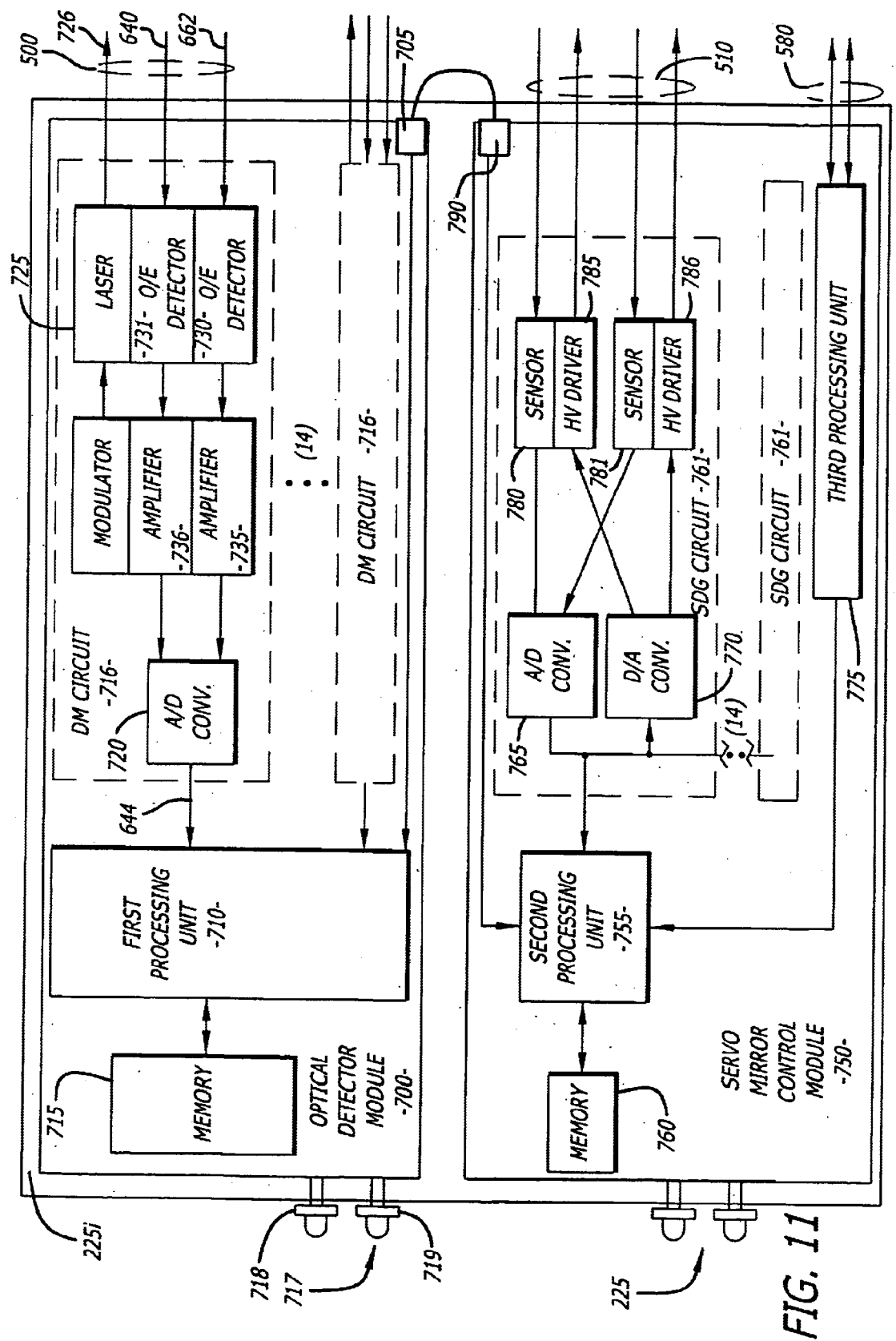
FIG. 11 is an exemplary embodiment of a servo module of the optical cross-connect system of FIG. 1.

In the event that no optical power is presented to the I/O port module $215_s$, a substitute light signal may be injected from the servo module $225_i$ via link 500. An alignment laser may be used as shown in FIG. 11 described below. This process of light substitution allows for connection establishment and verification when no input light is present to the I/O port module $215_s$. The substitute light source can be within the same wavelength range (e.g. 1100 nanometers "nm"—1700 nm) as the allowed input light signal range. In one embodiment, the light source or method of injection would be chosen to not interfere with attached equipment's select operational wavelength range. Choosing a different wavelength source on the servo module and/or a wavelength specific splitter and/or filter on the I/O port module could do this particular embodiment.

The management control subsystem 235 (see FIG. 2) enables communications between two or more servo modules placed within the same or different platforms. The management control subsystem 235 includes at least one servo control module 236 and an optional network control module 238. In one embodiment, the servo control module (SCM) 236 ensures communication between at least servo modules $225_i$ and $225_j$ that control mirrors associated with the first optical switch core 240. The network control module (NCM) 238 manages the execution of connection configurations for the whole cross-connect switching system and ensures communications between multiple servo control modules 236 and 237. The same architecture is used to control optical switches within the second optical switch core 260 as shown.

II. General Architecture of the I/O Port Modules

Figure 8:
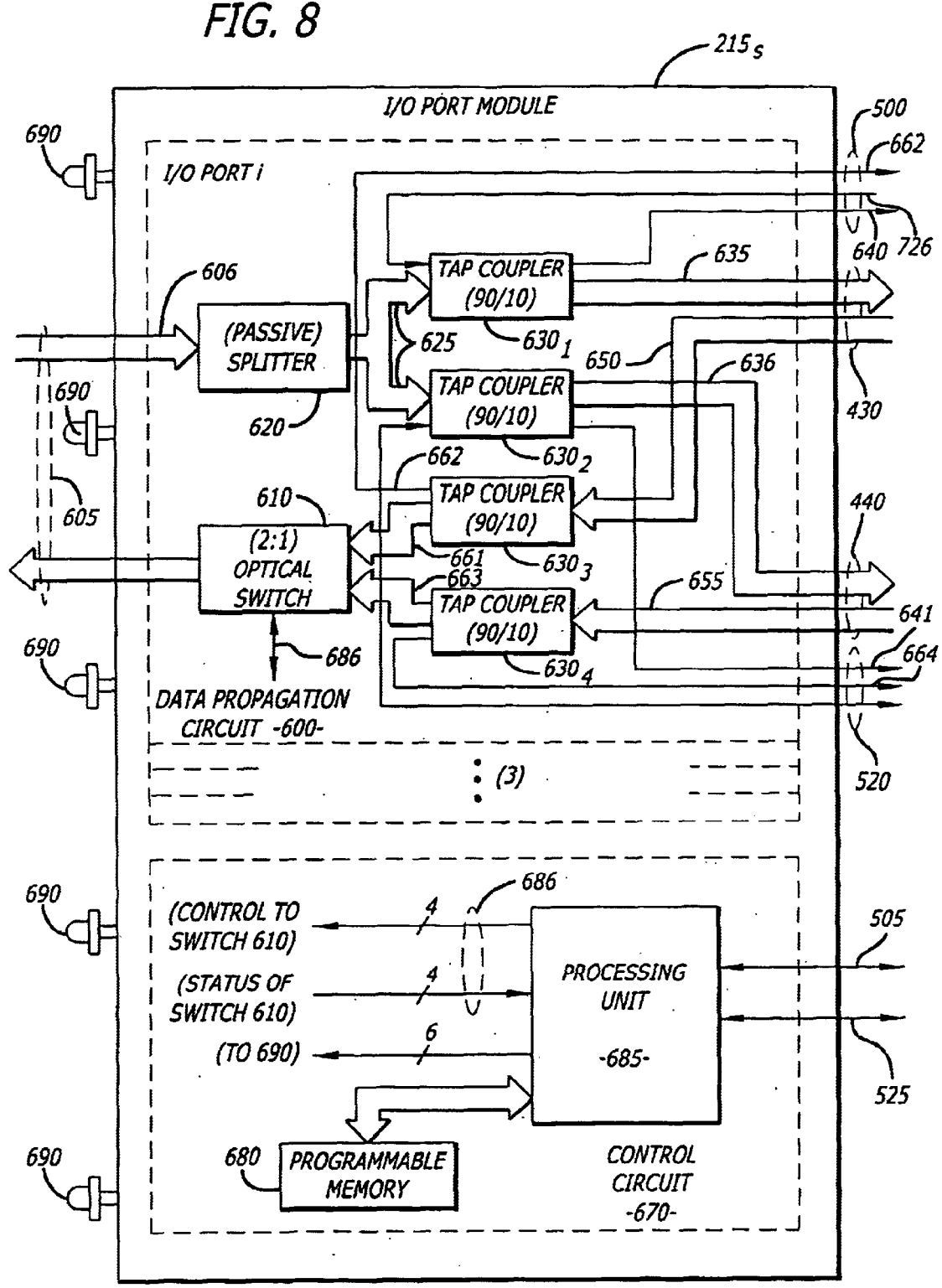
FIG. 8 is an exemplary embodiment of the I/O port module of FIGS. 6 and 7 illustrating a data propagation circuit and a control circuit.
Figure 9:
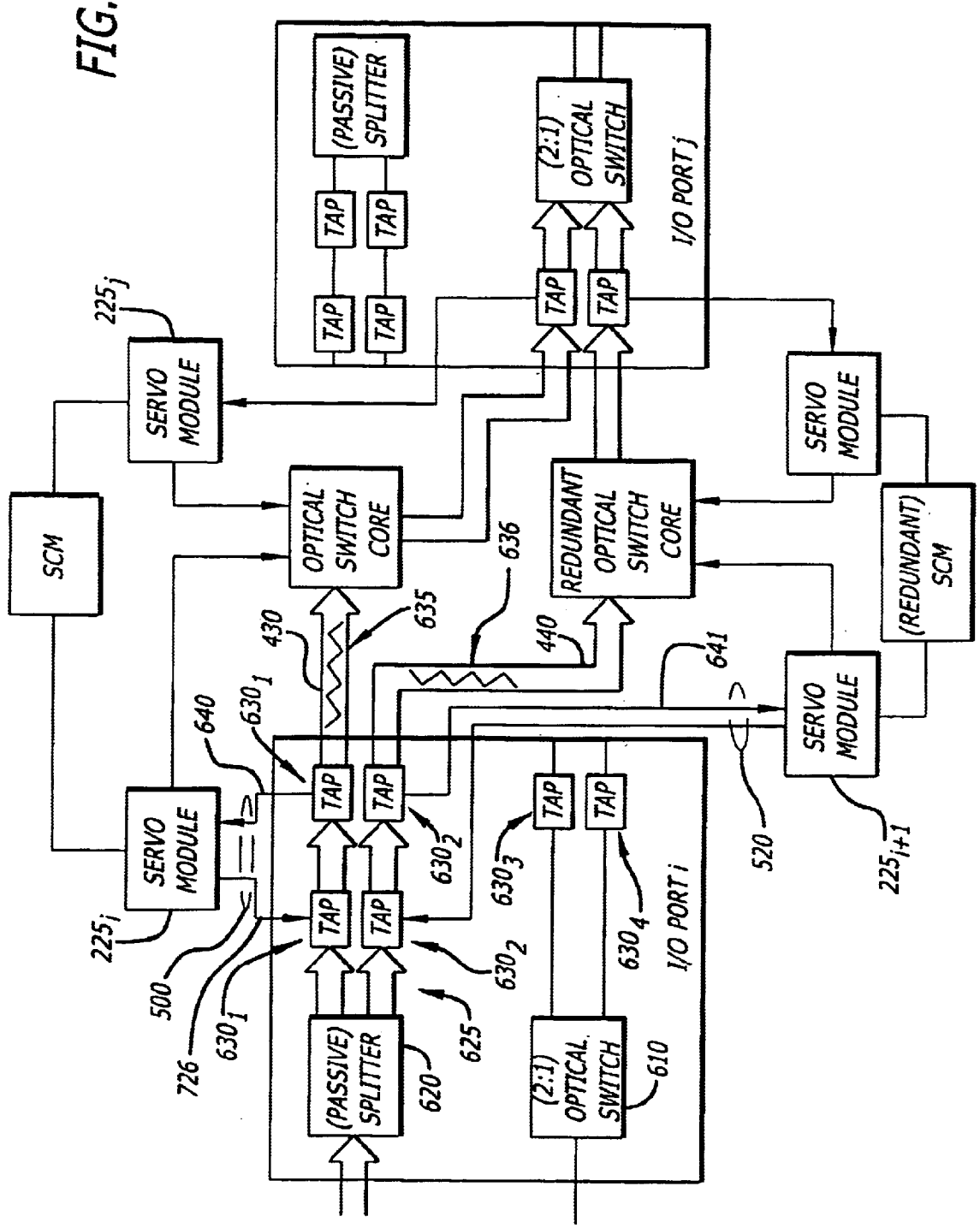
FIG. 9 is an exemplary embodiment of multiple ports of I/O modules in communication with optical switches controlled by servo modules.

Referring now to FIGS. 8 and 9, an exemplary embodiment of an I/O port module (e.g., I/O port module $215_g$) and its communications over optical switch cores 240 and 260 is shown. I/O port module $215_s$ includes a data propagation circuit 600 for each I/O port and a control circuit 670. Thus, in the event that the I/O port module $215_s$ is configured with four I/O ports, four data propagation circuits are implemented on the I/O port module $215_s$ as represented. Only the data propagation circuit 600 for one of the I/O ports of I/O port module 215, (e.g., $i^{th}$ I/O port) is shown in detail for clarity sake.

In one embodiment, the data propagation circuit 600 comprises an optical switch 610, a (passive) splitter 620 and a plurality of tap couplers $630_1$–$630_4$. The plurality of tap couplers $630_1$–$630_4$ correspond to the pairs of optical fibers found in optical fibber ribbon links 430 and 440. The control circuit 670 comprises a programmable memory 680, a processing unit 685 and status identification components 690.

As shown, each port of the I/O port module $215_s$ supports full-duplex communications. Thus, an incoming light signal 606 received over port 605 is routed to the splitter 620. The splitter 620 effectively performs a bridging operation by splitting the incoming light signal 606 into bridged light signals 625, which collectively have the same power level (energy) as the light signal 606. In one embodiment, when the splitter 620 is a 50/50 splitter, the bridged light signals 625 have equal power levels. However, it is contemplated that splitter 620 may produce bridged light signals 625 having disproportionate power levels.

The bridged light signals 625 are routed through the tap couplers $630_1$ and $630_2$. Attached to servo module $225_j$ and servo module $225_{i+1}$ via optical tap links 500 and 520, the tap couplers $630_1$, and $630_2$ are used to monitor the power level of light signals 635 and 636 propagating through optical fiber ribbon links 430 and 440 (referred to as "outgoing light signals"). This enables the servo modules $225_i$ and $225_{i+1}$ to verify the connectivity of the splitter 620 to optical fiber ribbon links 430 and 440 and to detect unacceptable variances in optical performance of the light signal. As shown for this embodiment, the tap couplers $630_1$ and $630_2$ may separate the bridged light signals into signals having disproportionate power levels in order to maximize the power levels of the outgoing light signals propagating through optical fiber ribbon links 430 and 440. For example, where the tap couplers $630_1$ and $630_2$ may operate as 90/10 splitters, the outgoing light signals 635 and 636 have ninety (90%) of the total power level of the bridged light signal while the tap optical signals 640 and 641 have only ten percent (10%).

Referring to FIG. 8, tap couplers $630_3$ and $630_4$ are configured to receive incoming light signal 650 and 655 via optical fiber ribbon links 430 and 440, respectively. The tap couplers $630_3$ and $630_4$ effectively separate the light signals 650 and 655 into corresponding pairs of light signals having disproportionate power levels (e.g., signals 661, 662 and 663, 664). Signals 662 and 664 having the lower power level are provided to the servo module $225_i$ and servo module $225_{i+1}$ via links 500 and 520 for monitoring the power levels of the light signals 661 and 663, without the light signals 661 and 663 experiencing substantial signal degradation. The signals 662 and 664 may be light signals that undergo O/E conversion at the I/O port module $215_s$ or at the servo modules $225_i$ and $225_{i+1}$ as shown in FIG. 11. The tap couplers $630_3$ and $630_4$ are shown as 90/10 splitters; however, tap couplers $630_3$ and $630_4$ may be any selected ratio, including 50/50.

Figure 10:
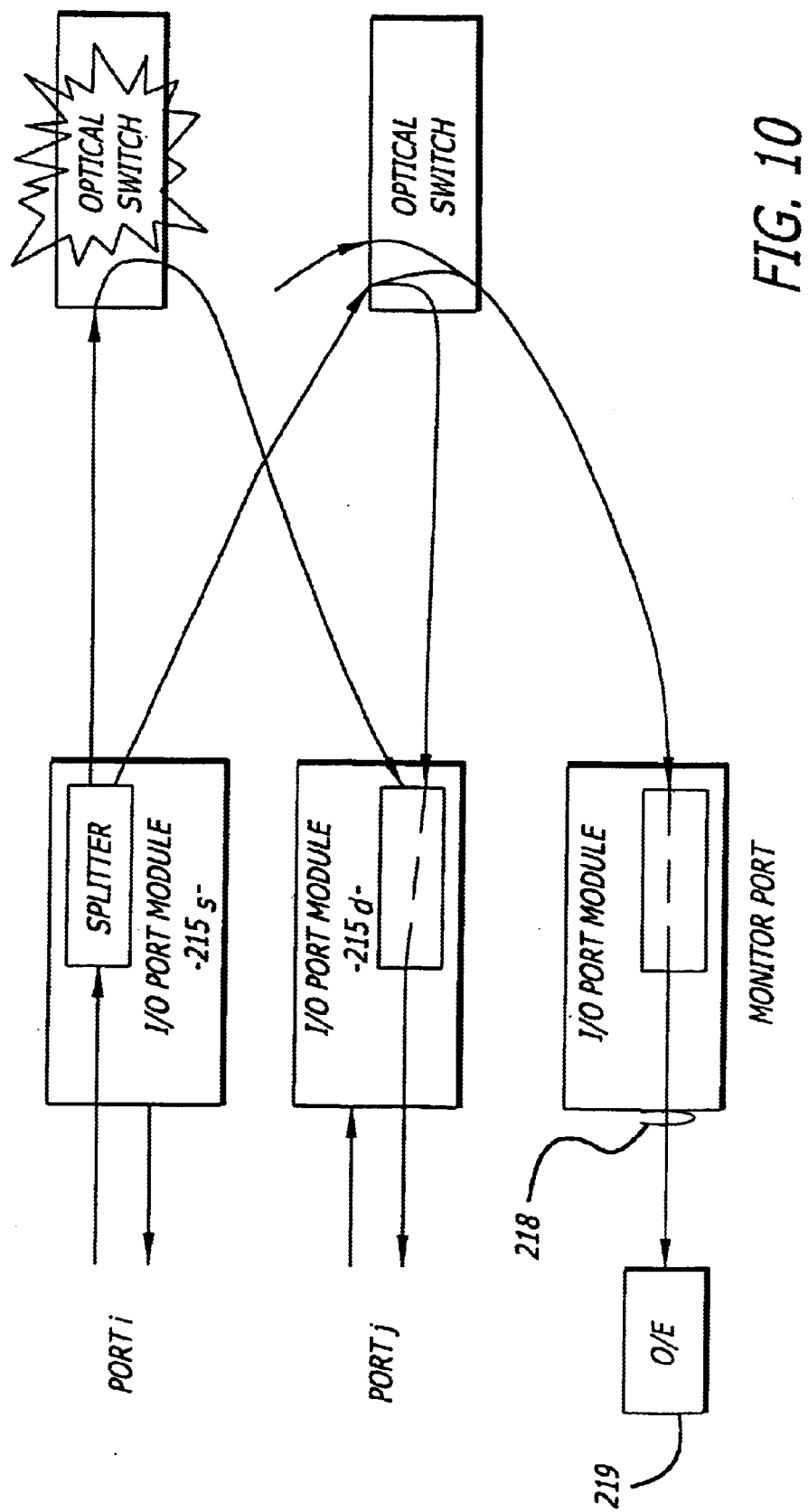
FIG. 10 is an exemplary embodiment of an I/O port configured as a test access port.

The light signals 661 and 663 are routed to the optical switch 610 of a destined I/O port. The control circuit 650 on the I/O port module $215_s$ determines which of the pair of light signals 661 and 663 has the best signal quality based on conveyed light signal quality information from the servo modules via links 505 and 525 as briefly described below. Parameters used to determine light signal quality include measured optical signal intensity/power, extinction ratio, and the like. The light signal quality information to the I/O port module may be conveyed as failed due to the servo module service operations, high bit error rate, an external light path has failed, and the like. The light signal 661 or 663 with the best signal quality is output through the I/O port 605. Of course, it is contemplated that the light signal output operations described for I/O port i are applicable to I/O port j as shown. It is contemplated that an I/O port of the I/O port module $215_s$ may be configured as a test access port. A "test access port" is an I/O port that is used for monitoring light signals routed through another port. Normally, the test access port receives a portion of the power level of a light signal routed through a selected optical switch (e.g., micro-machined mirror). For example, as shown in FIG. 10, an I/O port 218 of the I/O port module 215, is configured for coupling with a monitoring device 219 (e.g., a bit error rate "BER" monitor in combination with an optical-electrical "O/E" converter, etc.) to monitor a power level of a light signal routed to the $i^{th}$ I/O port from an optical switch.

Referring back to FIG. 8, the control circuit 670 comprises the programmable memory 680 in communication with the processing unit 685 (e.g., FPGA). The programmable memory 680 contains software and other information used by the processing unit 685 to provide selection of the best quality signal based on digital electrical signaling from servo module $225_i$ and servo module $225_{i+1}$ over links 505 and 525, respectively. Also, programmable memory 680 includes information used by the processing unit 685 to control the state of the status identification components 690 (e.g., light emitting diodes "LEDs"). The state of the status identification components 690 identifies (1) whether each I/O port is operational and/or (2) whether the I/O port module is operational. The processing unit 685 is further in communications with optical switches of each data propagation circuit employed in the I/O port module $215_s$ in order to receive switch status signals and provide switch control signals. As shown for clarity, processing unit 685 provides optical switch 610 with switch control signals for receiving switch status signals and selecting either light signal 661 or light signal 663.

III. General Architecture of the Servo Modules

Referring now to FIG. 11, an exemplary embodiment of the servo module (e.g., servo module $225_i$) is shown. In one embodiment, the servo module $225_i$ comprises two separate modules in communication over connectors 705 and 790. These separate modules are referred to as an "optical detector module" 700 and a "servo mirror control module" 750.

The optical detector module 700 comprises a first processing unit 710, memory 715, a plurality of detection/modulation (DM) circuits 716 and status identification components 717. As shown, the optical detector module 700 features sixteen (16) DM circuits 716 to support four (4) quad-port I/O port modules. Each DM circuit 716 includes an analog-to-digital (A/D) converter 720, a laser 725, optical-electrical (O/E) detectors 730 and 731, and optional amplifiers 735 and 736.

The servo mirror control module 750 comprises a second processing unit 755, a memory 760, a plurality of mirror signal detection and generation (SDG) circuits 761, a third processing unit 775 and status identification components 795. The SDG circuits 761 correspond in number to the DM circuits 716 of the optical detector module 700. Each SDG circuit 761 features an A/D converter 765, a digital-to-analog (D/A) converter 770, hinge position sensors 780–781 and high voltage (HV) mirror drivers 785–786.

As shown in FIG. 11, the optical detector module 700 is removably coupled to the servo mirror control module 750. This allows the optical detector module 700 to be "hot swapped" from a backplane, which features connectors 705 and 790 connecting the optical detector module 700 to the servo mirror control module 750, without disrupting the servo mirror control module's 750 ability to hold the mirrors in their existing positions for an extended period of time. This "hot swapping" of the optical detector module 700 allows for repair or upgrade of the optical detector module 700. Optical detector module 700 receives optical tap (feedback) signals 640 and 662 from one or more I/O port modules (e.g., I/O port module 215 via link 500) and can transmit optical control signals 726 from the laser 725 for alignment of light signals transferred between two I/O port modules. The optical tap signal 640 is based on an input light signal that is routed to the switch fabric.

More specifically, with respect to servo module $225_i$, the O/E detectors 730 and 731 are coupled to tap couplers $630$, and 6303 of FIGS. 8–9. More specifically, the O/E detectors 730 and 731 are configured to detect incoming, optical tap signals 640 and 662, convert the optical tap signals 640 and 662 into corresponding electrical control signals measuring a power level of the outgoing light signal, and optionally route the electrical control signals to corresponding amplifiers 735 and 736. The (amplified) electrical control signals are provided to the A/D converter 720. The A/D converter 720 converts the electrical control signals into measured power sense signals 644 of a digital form. The measured power sense signals 644 are provided to the first processing unit 710. Herein, the first processing unit 710 may perform a number of operations based on the electrical control signals such as threshold crossing, LOS integration, input/output power ratio analysis and the like. Software and other information necessary for performing these operations may be obtained from the memory 715 by the first processing unit 710. Herein, memory 715 can be non-volatile memory such as non-volatile random access memory, electrically erasable programmable read only memory (EEPROM) and the like.

The optical detector module 700 includes multiple status identification components 717 (e.g., light emitting diodes "LEDs"). A first LED 718 identifies whether any operational faults associated with the servo module $225_i$ have occurred. A second LED 719 indicates when the optical detector module 700 is in service.

Referring still to FIG. 11, in this embodiment, the servo mirror control module 750 comprises the second processing unit 755 that is coupled to both the first processing unit 710 and the third processing unit 775. For instance, in order to adjust the switch fabric in response to the measured power sense signals 644, the second processing unit 755 receives information representative of the measured power sense signals from the first processing unit 710 via connectors 705 and 790. The second processing unit 755 further receives information representative of measured power sense signals for the light signal at a targeted I/O port. This information is provided by the SCM 236 over link 580 via the third processing unit 775. This assists in reducing errors in adjusting the torsional flexures of the mirrors.

Upon receipt of these measured power readings, the second processing unit 755 controls a particular SDG circuit corresponding to a mirror associated with the I/O port over which the tapped light signal was routed. The control involves slight mirror orientation adjustments if the power level readings differ substantially.

In particular, a first hinge position sensor 780 senses a position of a mirror via link 510 from the first optical switch core 240. The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 785 and applied to a selected mirror of the first optical switch core in order to adjust the amount of torsional flexure along a first dimensional plane (e.g., X-axis). This is accomplished to minimize the loss experienced by the light signal.

A second hinge position sensor 781 senses a position of a mirror for the first optical switch core along a second dimensional plane (e.g., Y-axis). The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 786 and are applied to the selected mirror of the first optical switch core in order to adjust the amount of torsional flexure along the second dimensional plane. The specifics of the hinge position sensors 780 and 781 are described in PCT application entitled "Micromachined Members Coupled for Relative Rotation By Torsional Flexure Hinges" (International Publication No. WO 00/13210) published on or around Mar. 9, 2000.

In another embodiment, when I/O port module $215_s$ is the destination of a light signal, the second processing unit 755 receives information representative of the measured power sense signals associated with the optical tap signal 662 that has been analyzed by the first processing unit 710. The optical tap signal 662 is based on an output light signal being routed from an I/O port. In this situation, the third processing unit 775 receives information associated with the measured power sense signals from a source I/O port as reported by SCM 236 over link 580.

IV. Redundant Architecture of the Optical Cross-Connect Switching System

Figure 12:
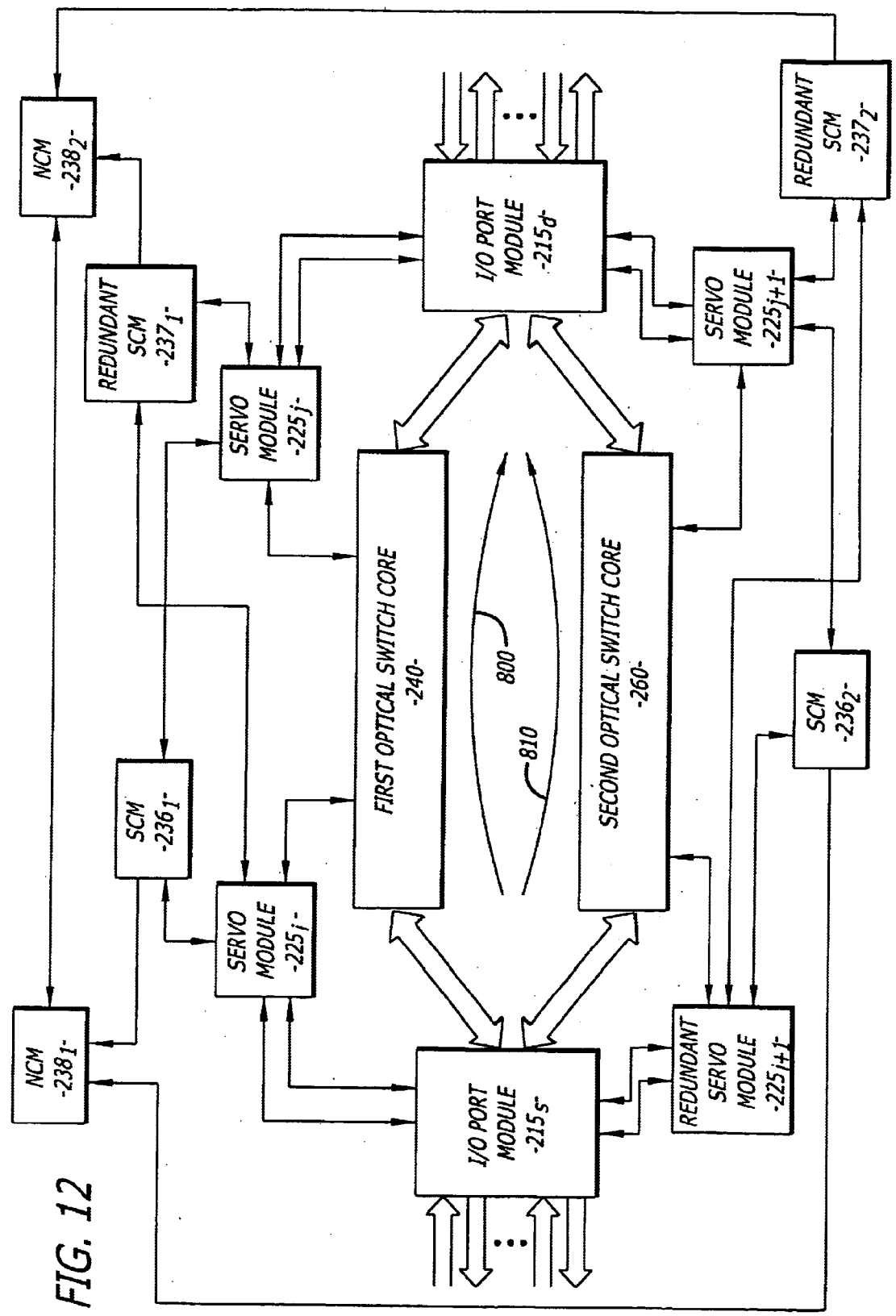
FIG. 12 is an exemplary block diagram of a redundant architecture of the optical cross-connect switching system of FIG. 1.

Referring now to FIG. 12, a block diagram of an alternative embodiment of the architecture of the optical cross-connect switching system of FIG. 1 is shown which includes redundant protection capabilities. Redundancy is desired in order to increase the reliability of such an optical cross-connect switching system. Aside from the I/O port modules, all other modules are duplicated to obtain the desired redundancy. Thus, it is necessary for light signals from a source I/O port module $215_d$ to be routed to, a destination I/O port module $215_d$ through two optical paths, namely a primary optical path 800 using a first optical switch core 240 and a redundant optical path 810 using a second optical switch core 260.

With respect to the primary optical path 800, a servo module $225_i$ is connected to both the source I/O port module 215, and the first optical switch matrix (not shown) of the first optical switch core 240. In particular, the servo module $225_i$ controls the physical orientation of a mirror of the first optical switch matrix that corresponds to the source I/O port module $215_s$. To establish and maintain the primary optical path 800 for the light signal, the servo module $225_i$ needs to communicate with other servo modules such as servo module $225_j$. Thus, a servo control module (SCM) is implemented to support such communications, possibly through a time-slot switching arrangement.

As shown, the SCMs 2361–2362 are also duplicated so that each servo module 225 is connected to at least two SCMs $236_1$–$236_2$. Thus, in the event that the SCM $236_1$ ails, the primary optical path 800 remains intact because communications between the servo modules $225_i$ and $225_j$ are maintained via redundant SCM $237_1$. The transfer is accomplished by temporarily halting the adjustment of (i.e. freezing) the mirrors inside the first optical switch core 240 while control is transferred from SCM 236, to SCM $237_1$. The SCMs $236_1$ and $237_1$ associated with the first optical switch core 240 are in communication via a network control modules (NCMs) $238_1$ and $238_2$ for example.

With respect to the redundant optical path 810, a servo module $225_{i+1}$ is connected to both the source I/O port module $215_s$ and one or more mirror(s) of a first optical switch matrix (not shown) of the second optical switch core 260. Another servo module $225_{j+1}$ is connected to both the destination I/O port module $215_d$ and one or more mirror(s) of a second optical switch matrix (not shown) of the second optical switch core 260. The orientation of these mirrors produces the redundant optical path 810.

To establish and maintain the redundant optical path 810 for the light signal, a SCM 2362 may be implemented with a dedicated time-slot switching arrangement in order to support continuous communications between the servo module and another redundant servo module associated with the destination I/O port module. As shown, the SCM $236_2$ is also duplicated so that each servo module $225_{i+1}$ and $225_j+1$ is connected to at least two SCMs $236_2$ and $237_2$. Thus, the redundant optical path 810 is maintained even when one of the SCMs $236_2$ and $237_2$ fails. The SCMs $236_2$ and $237_2$ associated with the second optical switch core 260 communicate via the first NCM 238$_1$ and the second NCM 238$_2$, respectively. The second NCM 238$_2$ is in communication with the first NCM 238$_1$ to allow all SCMs and servo modules to communicate for coordination of the primary optical path 800 and the redundant optical path 810.

V. Signaling Interface

Figure 13:
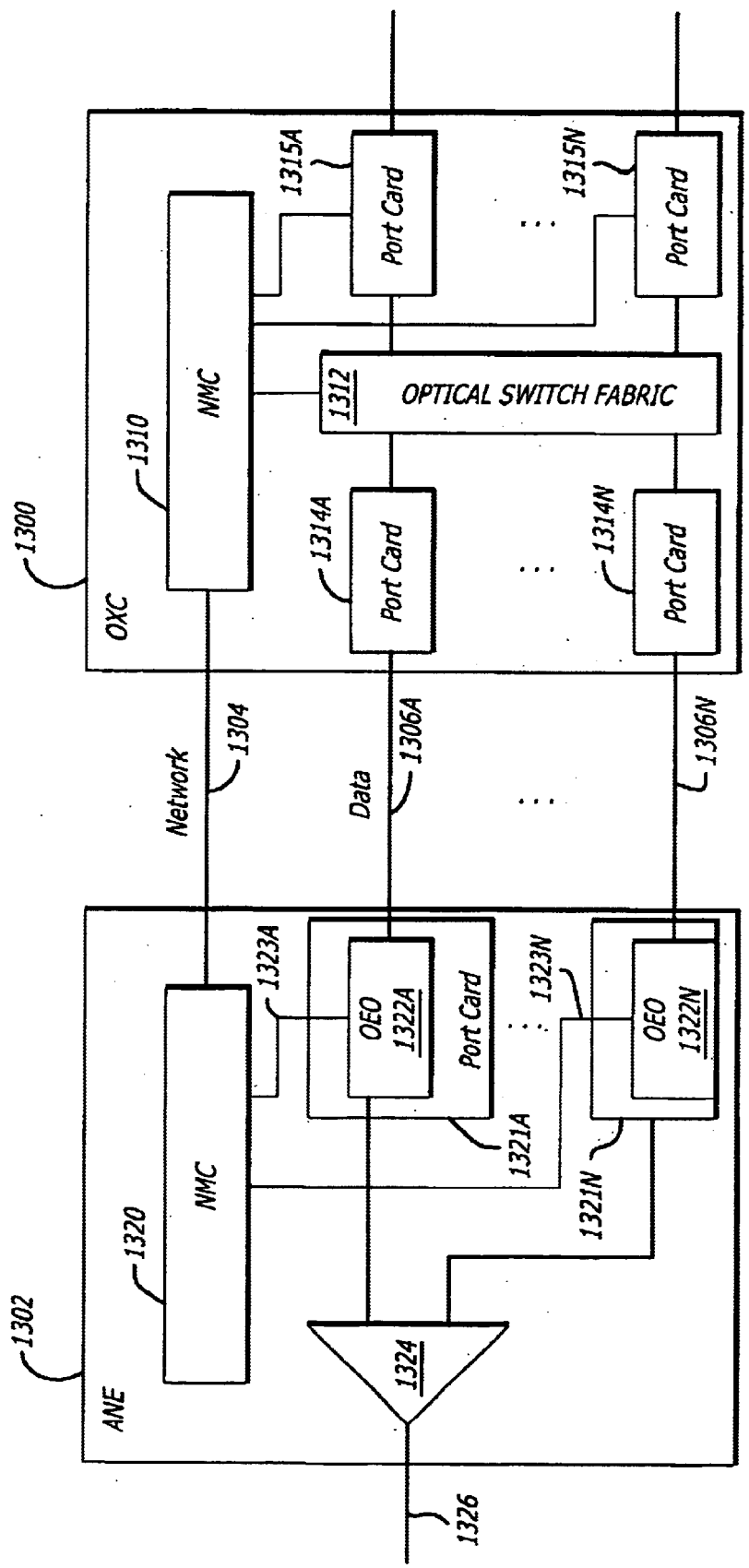
FIG. 13 is a block diagram illustrating an out-of-band signaling interface between an optical cross-connect switch and attached network equipment.

The present invention includes alternate embodiments for realizing a signaling interface between optical cross-connect switches and attached network equipment (ANE). Referring to FIG. 13, optical cross-connect switches (OXCs) 1300 are deployed in a telecommunications network. An optical cross-connect switch can also be referred to herein as optical cross-connect switching system, OXC, or optical cross-connect. Attached to the optical cross-connect switches in a telecommunications network is one or more pieces of attached network equipment (ANE) 1302. The attached network equipment (ANE) 1302 includes telecommunication network devices such as a wavelength division multiplexed (WDM) line terminals, SONET add/drop multiplexers, internet protocol (IP) routers, additional optical cross-connect switches and Asynchronous Transfer Mode (ATM) switches which are also collectively referred to as client equipment. WDM line terminals provide interconnection between sites and are also terminating devices included in SONET add/drop multiplexers, internet protocol (IP) routers, or Asynchronous Transfer Mode (ATM) switches. The present invention establishes a signaling interface between the optical cross-connects 1300 and attached network equipment (ANE) 1302.

There are a number of reasons for establishing a signaling interface between the optical cross-connects 1300 and attached network equipment (ANE). One reason is to allow the other network equipment in the telecommunications network to provision connections through the OXC. It is very desirable to allow other equipment to set up a connection through the OXC in an automated manner, rather than manually provisioning such connections. Another reason is to provide real-time performance monitoring and other management information to the optical cross-connects 1300 from the attached network equipment 1302. By providing a signaling interface where performance information is provided back to the optical cross-connects 1300, expensive monitoring elements are not needed inside the optical cross-connects 1300 and costs are saved. The attached network equipment usually already have electronic components for monitoring signals, such as optical-to-electrical-to-optical converters (OEOs or O/E/Os), in order to extract such information from optical signals. Thus, the electronics for monitoring do not need to be duplicated inside the optical cross-connects 1300 when they are already provided in the attached network equipment 1302. Instead the optical cross-connects 1300 can obtain the real-time performance monitoring and other management information from the other network equipment that is attached to the optical cross-connects 1300 through a signaling channel. Another reason to establish a signaling interface is so that the attached network equipment 1302 can obtain monitoring and other management information real-time from the optical cross-connects 1300. The optical cross-connects 1300 can similarly monitor received optical signals on its input ports and provide information back to the attached network equipment 1302. Preferably, the optical cross-connects 1300 only monitor the optical power of the received optical signals by tapping off a small percentage of the energy of the optical signal and use optical-to-electrical converters (OEs or O/Es) to determine the optical power without using O/E/Os.

FIG. 13 illustrates a block diagram of an out-of-band signaling interface between an optical cross-connect switch 1300 and attached network equipment 1302. The signaling interface is realized by using an out-of-band communication channel over a network 1304 which may also be referred to as an out-of-band signaling channel. In-band communication channels are those used by the optical cross-connect switch 1300 to switch data signals on the one or more data signals lines 1306A–1306N. An out-of-band communication channel is a communication channel other than that used by the optical cross-connect switch 1300 to switch its data signals on the data lines 1306A–1306N. The in-band communication channels used to switch data signals on the data lines 1306A–1306N by the optical cross-connect switch 1300 are light signals, also referred to as photonic signals or optical signals, that are carried in optical fibers. The data lines 1306A–1306N are not used for the signaling interface because these lines carry high-bandwidth signals. To convert optical signals in the optical domain into electrical signals in the electrical domain to extract signaling information is a very expensive process. Indeed, a major reason for using an all-optical cross-connect is to avoid converting signals from the optical domain to the electrical domain. The out-of-band signaling channel is provided on a network 1304 such as a LAN, a MAN, the internet or other WAN. Each of the data lines 1360A–1306N is bi-directional to provide duplex data communication channels. The data lines 1306A–1306N in one embodiment include at least two optical fibers for data flow in each direction between the optical cross-connect switch and the attached network equipment 1402 to provide full duplex data communication channels. In another embodiment, each of the data lines 1306A–1306N is a single optical fiber to provide bi-directional signal flow in both directions and can be full or half duplex data communication over a single optical fiber. Full duplex is accomplished over a single optical fiber by transmitting and detecting signals in the single optical fiber at each end. The network 1304 also provides a bi-directional out-of-band signaling channel so that signals can be received and transmitted in each direction between the optical cross-connect switch and the attached network equipment 1402 and other network equipment coupled to the network 1304. The out-of-band signaling channel can be either full duplex or half duplex in providing bi-directional data communication.

Data signals from the optical cross-connect switch 1300 on the data lines 1306A–1306N are coupled into the attached network equipment 1302. The data lines 1306A–1306N are a light transmission media, such as optical fibers, coupled between the optical cross-connect switch 1300 and the attached network equipment 1302 to carry or transport the light pulses or photon pulses of the data signals there-between. That is, the attached network equipment 1302 is coupled or attached to the optical cross-connect switch 1300 to accept data signals transported over the one or more data lines 1306A–1306N. Data signals from the attached network equipment (ANE) 1302 on the data lines 1306A–1306N are coupled into the optical cross-connect switch 1300. The optical cross-connect switch 1300 is coupled or attached to the attached network equipment 1302 to accept data signals transported over the one or more data lines 1306A–1306N. The optical cross-connect switch 1300 includes the network management controller (NMC) 1310 (also previously referred to herein as a network control module (NCM)), one or more I/O port cards 1314A–1314N and 1315A–1315N, and the optical switch fabric 1312. The optical switch fabric generates optical paths therein in order to cross-connect (also referred to as route or switch) optical signals from an I/O port card on the input side to an I/O port card on the output side. The optical paths are bi-directional in that the optical signal can flow in either direction with the optical path coupled to either an input port or an output port of a port card. I/O port cards can also be referred to as line cards, port cards, or I/O port modules as previously used herein. Each of the one or more I/O port cards 1314A–1314N and 1315A–1315N of the optical cross-connect switch 1300 includes an optical input port and an optical output port to couple to the optical fibers of the full duplex data lines 1306A–1306N. Port cards 1314 can also include some simple monitoring functions by tapping off a small percentage of the energy of the optical signal and converting it into an electrical signal using an inexpensive O/E. However, port cards 1314 do not need a full-fledged receiver for extensive monitoring of parameters such as a bit error rate or the presence of a particular frame because the signaling interface of the present invention is provided in order to acquire such information from other network equipment.

The attached network equipment 1302 includes a network management controller 1320 and one or more I/O port cards 1321A–1321N (also referred to as line cards or herein previously as I/O port modules). Each of the one or more I/O port cards 1321A–1321N includes an optical-electrical-optical converter 1322A–1322N on its data input ports to couple to optical fibers of the data lines 1306A–1306N. The one or more optical-electrical-optical converters 1322A–1322N first convert the optical signals on the data lines 1306A–1306N into electrical signals and then convert the electrical signals into optical signals.

The one or more optical-electrical-optical converters 1322A–1322N can be used for a number of reasons including to generate electrical signals to monitor the optical signal as well as to amplify (i.e. regenerate) low level incoming optical signals. In the conversion process, the one or more optical-electrical-optical converters 1322A–1322N provide information regarding the optical signals in electrical form which is tapped for monitoring purposes as the electrical signals 1323A–1323N. The electrical signals 1323A–1323N may include information from other sources of the respective port card 1315A–1315N that may be of relevance to the optical cross-connect switch. The one or more optical-electrical-optical converters 1322A–1322N and their electrical signals were originally used in the attached network equipment 1302 to facilitate its functionality and monitor its performance and not provide feedback to an optical cross-connect switch.

The electrical signals 1323A–1323N are coupled into the network management controller (NMC) 1320 of the attached network equipment 1302. In one embodiment, the electrical signals 1323A–1323N, or a representation thereof, are signaled back to the optical cross-connect switch 1300 over the out-of-band signaling channel on the network 1304. The electrical signals 1323A–1323N, or a representation thereof, are transmitted from the network management controller 1320 in the attached network equipment 1302 to the network management controller 1310 in the optical cross-connect switch 1300. In this manner, the attached network equipment 1302 signals to the optical cross-connect switch 1300. In a similar manner with differing information, the optical cross-connect switch 1300 can signal to the attached network equipment 1302 over the out-of-band signaling channel.

The optical-electrical-optical converters 1322A–1322N are expensive and as a result of being already available in the attached network equipment 1302, they are not needed in the optical cross-connect switch 1300 if the signaling interface of the present invention is provided. This can provide considerable cost savings when purchasing optical cross-connect switches 1300.

In FIG. 13, the attached network equipment 1302 that is coupled to the optical cross-connect switch 1300 is a WDM line terminal 1302 which also includes a wave division multiplexer/demultiplexer 1324 along with the network management controller 1320 and the one or more port cards 1321A–1321N with the optical-electrical-optical converters 1322A–1322N. The wave division multiplexer/demultiplexer 1324 couples to a pair of optical fibers on one end to carry wave divisioned multiplexed signals 1326 in each direction for full duplex communication and one or more pairs of optical fibers on an opposite end to couple to the I/O port cards 1321A–1321N. The wave division multiplexer/demultiplexer 1324 multiplexes multiple light signals received from respective optical fibers in one direction into a wave division multiplexed signal 1326 having multiple light signals of different wavelengths carried over one optical fiber. The wave division multiplexer/demultiplexer 1324 demultiplexes a wave division multiplexed signal 1326 in an opposite direction having multiple light signals of different wavelengths carried over one optical fiber into multiple light signals for transmission to the optical cross-connect switch 1300 over the data lines 1306A–1306N. The wave division multiplexed signal 1326 provides greater data bandwidth and channel capacity over an optical fiber.

The network connection to the network 1304 for the out-of-band signaling channel is an Ethernet, an RS232 or other similar connection connecting together the network management controllers (NMCs) (also previously referred to as a network control module (NCM)) of the optical cross-connect switch 1300 and the attached network equipment 1302. Because the out-of-band signaling channel is provided over the network 1304, other network equipment or monitoring stations can receive information and transmit information or control signals over the out-of band signaling channel regarding the network, the network equipment and the optical network components connected to the network. Thus, management of the network can be facilitated regarding the optical cross-connect 1300, the attached network equipment 1302, and other network equipment using the out-of-band signaling channel. The out-of-band signaling channel over the network can be considered a centralized signaling interface.

Figure 14:
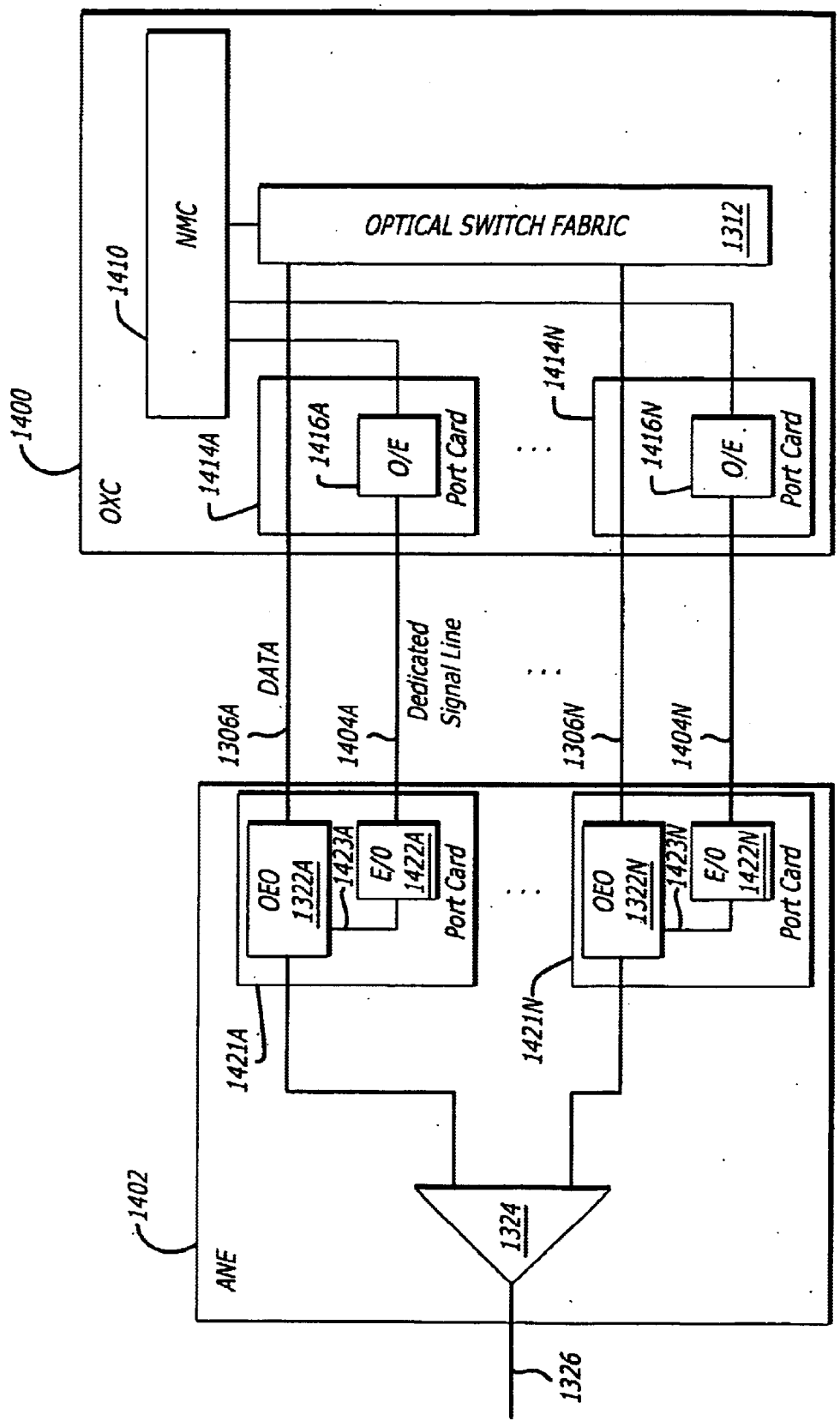
FIG. 14 is a block diagram illustrating a decentralized signaling interface between an optical cross-connect switch and attached network equipment.

Referring now to FIG. 14 a block diagram of a decentralized signaling interface between an optical cross-connect switch 1400 and attached network equipment 1402 is illustrated. The decentralized signaling interface is provided by one or more dedicated signal lines 1404A–1404N between the optical cross-connect switch 1400 and the attached network equipment 1402. The one or more dedicated signal lines 1404A–1404N can be formed by using low-cost multimode (MM) optical fibers or by using low cost electrical wire links.

The one or more dedicated signal lines 1404A–1404N replaces the out-of-band signaling channel of the network 1304. Whereas the out-of-band signaling channel of the network 1304 provided signals regarding switching each of the optical signals on multiple communication channels, one dedicated signal line 1404 provides information regarding switching of optical signals on one communication channel. Furthermore, the centralized signaling between the between the optical cross-connect switch 1400 and the attached network equipment 1402 was performed by the centralized NMCs 1310 and 1320 at a central control level. In contrast, decentralized signaling is performed by the I/O port cards (also referred to as line cards or herein previously as I/O port modules) at a line-card level which is a much lower level than the centralized NMC level.

In the embodiment illustrated in FIG. 14, the optical cross-connect switch 1400 includes the network management controller (NMC) 1310, one or more I/O port cards 1414A–1414N (also referred to as line cards, port cards and I/O port modules), and the optical switch fabric 1312. Each of the one or more I/O port cards 1414A–1414N and 1415A–1415N of the optical cross-connect switch 1400 includes an optical input port and an optical output port. Each of the one or more port cards 1414A–1414N further may include optical-electrical converters (O/E) 1416A–1416N if the dedicated signal line is an optical fiber. The optical-electrical converters 1416A–1416N of the optical cross-connect switch are much less expensive than optical-electrical-optical converters (O/E/O) that might otherwise be needed therein. Optical-electrical converters (O/E) are typically a fiber optic receiver module which includes a photodetector.

The attached network equipment 1402 includes one or more port cards 1421A–1421N (also referred to as line cards). Each of the one or more port cards 1321A–1321N includes an optical-electrical-optical converter 1322A–1322N on its data input ports to couple to optical fibers of the data lines 1306A–1306N. In the case the dedicated signal lines 1404A–1404N are optical fibers, each of the one or more port cards 1321A–1321N further includes an electrical-optical converter (E/O) 1422A–1422N to convert electrical signals 1423A–1423N into optical signals. Electrical-optical converters (E/O) are typically a fiber optic transmitter module which include a semiconductor laser with control electronics. Optical-electrical-optical converters (O/E/O) are typically a combination of an O/E converter coupled together with an E/O converter.

The attached network equipment 1402 that is illustrated coupled to the optical cross-connect switch 1400 is a WDM line terminal 1402. A WDM line terminal 1402 also includes a wave division multiplexer 1324 along with the one or more port cards 1421A–1421N with the optical-electrical-optical converters 1322A–1322N.

The one or more optical-electrical-optical converters 1322A–1322N first convert the optical signals on the data lines 1306A–1306N into electrical signals and then convert the electrical signals into optical signals. The one or more optical-electrical-optical converters 1322A–1322N are tapped to provide information regarding the optical signals in electrical form on the electrical signals 1323A–1323N. The port cards 1421A–1421N of the attached network equipment 1402 detect other relevant information and communicate it directly to the respective port cards 1414A–1414N of the optical cross-connect switch 1400 over the dedicated signal lines 1404A–1404N rather than signaling between the central NMCs 1310 and 1320. Similarly, port cards 1414A–1414N of the optical cross-connect switch 1400 can detect relevant information and communicate it directly to the respective port cards 1421A–1421N of the attached network equipment 1402 over the dedicated signal lines 1404A–1404N.

Having established a signaling interface, it can be used for several purposes. The signaling interface can be used to enable fast network restoration through the optical cross-connect switch (OXC) in the event of network failures. Network failures include signal failures such as a loss of signal (LOS) or signal degradation such as through a bit error rate (BER) or other commonly know optical failure mechanisms. Attached network equipment (ANE) can detect failures in real time by using its O/E/Os and convey this information to the optical cross-connect switch over the signaling interface so that it can perform network restoration. The optical cross-connect switch is typically without O/E/Os and may not be able to detect the failure due to the otherwise relatively simple monitoring usually found within an optical cross-connect switch.

Another use for the signaling interface is to allow attached network equipment (ANE) to control the optical cross-connect switch (OXC). For example, the attached network equipment (ANE) could signal to the OXC over the signaling interface in order for it to provide a particular switch configuration.

Another use for the signaling interface is so that the optical cross-connect switch can signal to the attached network equipment to set specific parameters therein. For example during setting up a connection, the optical cross-connect switch may ask the attached equipment to adjust its transmitter power level.

Another use for the signaling interface is to allow attached network equipment (ANE) to request a connection through the optical cross-connect switch (OXC). The optical cross-connect switch (OXC) sets up the connection and informs the attached network equipment (ANE) when its available.

Another use for the signaling interface is to perform protection switching between the OXC and the attached network equipment. For example, the signaling interface could be provided by one spare fiber facility for N working facilities between the attached equipment and the OXC. If bone of these N facilities fails, the signaling channel is used by both devices to switch connections from the failed facility to the spare facility.

VI. Connection Protection

The present invention provides against connection or link failures between the interconnection of client equipment and optical network equipment such as an optical cross-connect switch. The present invention decouples the connection protection that is provided between client equipment and the optical cross-connect switch from the optical network equipment protection and that which may be provided by a network of optical cross-connects switches to handle failures of links and nodes inside the network. This is important because differing protection used inside the network from a connection protection used between the client and the OXC provides increased reliability. Additionally, optical network protection provided between client equipment and optical cross-connect switches can use a more complex protection mechanism which uses bandwidth more efficiently.

Providing connection protection is particularly complex when the optical network equipment in question is an all-optical cross-connect switch. An all-optical cross-connect switch does not terminate the optical signals and convert them into electrical signals using optical-to-electrical converters on the input side. Moreover, an all-optical cross-connect switch does not necessarily incorporate electrical-to-optical (E/O) converters (i.e. transmitters or lasers) that it can turn ON and OFF to provide signaling to the other end. As a result, it is difficult to implement conventional protection schemes that rely on the presence of optical-to-electrical converters or electrical-to-optical converters inside the equipment to perform the protection. The present invention provides connection protection for optical network equipment including optical cross-connect switches and all-optical cross-connect switches.

Figure 15:
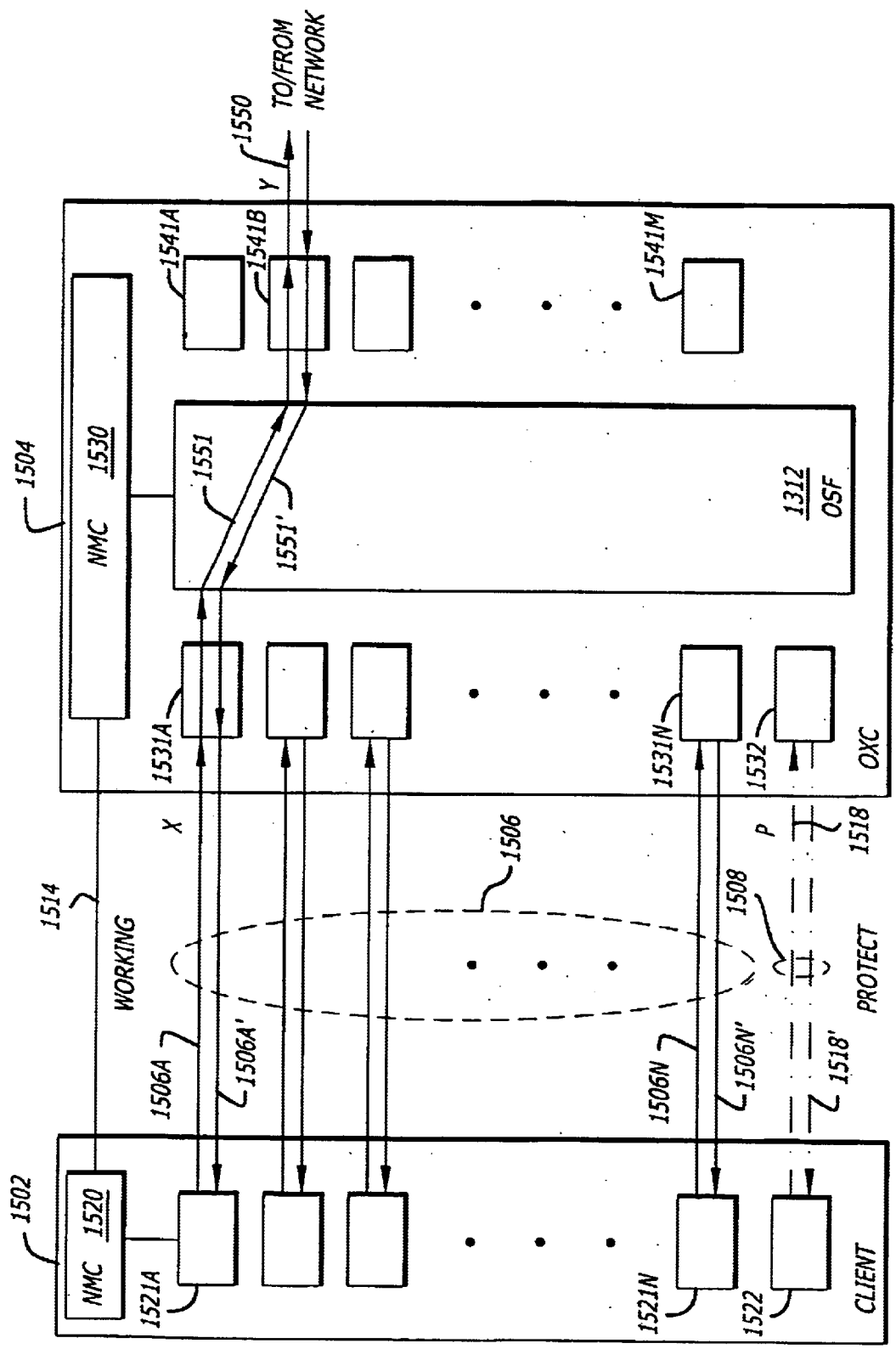
FIG. 15 is a block diagram illustrating an unused protection connection and a first signaling means between an optical cross-connect switch and a client.

Referring now to FIG. 15, client equipment (also referred to previously herein as attached network equipment) 1502 is coupled to an optical cross-connect switch (OXC) 1504 by means of the optical connections or working optical links 1506. Examples of client equipment 1502 include internet protocol (IP) routers, Synchronous Optical Network (SONET) terminals, add/drop multiplexers as well as additional optical cross-connect switches and other optical networking equipment. The protection provided by the present invention is facilitated by one or more extra full duplex connections between the client equipment 1502 and the optical cross-connect switch 1504 referred to herein as a protect connections, one of which is protect connection 1508. Also a signaling means for signaling purposes between the client equipment 1502 and the optical cross-connect switch 1504 is provided, such as the signaling channel 1514 which can be an out-of-band communication channel over the network 1304 which was previously discussed.

The optical links 1506 include N optical links 1506A–1506N and N optical links 1506A'-1506N'. The N optical links 1506A–1506N are for ordinarily transporting optical signals from the client 1502 to the optical cross-connect switch 1504 between ports 1521A–1521N and ports 1531A–1531N. The N optical links 1506A'-1506N' are for transporting optical signals from the optical cross-connect switch 1504 to the client 1502 between ports 1521A–1521N and ports 1531A–1531N. The optical links 1506A–1506N and 1506A'–1506N' are typically provided by fiber optic cables. The N optical links 1506A–1506N and N optical links 1506A'–1506N' can also be referred to as working links. Working links ordinarily transport or propagate optical signals between the client 1502 and the optical cross-connect switch 1504 when there is no connection failure.

During a connection failure of a working link, a protect connection can provide bi-directional transport of optical signals such as the protect connection 1508 which includes an optical link 1518 and an optical link 1518'. The optical link 1518 is for communicating signals from the client 1502 to the optical cross-connect switch 1504 between port 1522 and port 1532. The optical link 1518' is for communicating signals from the optical cross-connect switch 1504 to the client 1502 between port 1522 and port 1532. The optical links 1518 and 1518' are typically provided by fiber optic cables. The optical link 1518 and the optical link 1518' can also be referred to as protection links. The protection links 1518 and 1518' atypically bi-directionally transport optical signals between the client 1502 and the optical cross-connect switch 1504. That is, the protection links typically bi-directionally transport optical signals between the client 1502 and the optical cross-connect switch 1504 only when there is a connection failure in one of the working links. While two optical links have been disclosed, only a single optical link need be used to provide bi-directional transport of optical signals between the client 1502 and the optical cross-connect switch 1504 in certain cases.

The present invention provides M:N protection between the client equipment 1502 and the optical cross-connect switch 1504. That is for every N working I/O ports between the client 1502 and the optical cross-connect switch 1504 having N pairs of working links 1506 there-between between, there are M (where M is greater than or equal to one) additional I/O port(s) each being dedicated as a protect connection. The protect connection 1508 is an example of one protect connection with it being obvious that protect connection 1508 can be duplicated M times. In addition to the connectivity provided by the protect connection(s) and the additional ports, an automatic protection switching (APS) protocol is required to signal the failure, and transfer or switch the connection from the failed link to one of the M protect connections.

The client equipment 1502 includes a network management controller (NMC) 1520, N input/output (I/O) ports 1521A–1521N, and M (M being greater than or equal to one) extra I/O ports for every N I/O ports 1521A–1521N. I/O port 1522 is an example of one of the extra M I/O ports for every N I/O ports 1521A–1521N which is a spare protection port for the client equipment 1502. The N I/O ports 1521A–1521N couple to the N working links 1506 to communicate with the client 1502. The extra I/O port 1522 couples to the protection links or protection connection 1508. The N I/O ports and the extra I/O port(s) of the client 1502 are typically provided by I/O port cards. The NMC 1520 couples to the signaling channel 1514. Various signaling means can be used including the signaling channel 1514 which is an out-of-band signaling channel, for example an Ethernet, or an in-band signaling channel as previously discussed.

The N I/O ports 1521A–1521N of the client are also referred to herein as working ports or client ports. The M extra I/O ports of the client are also referred to as a protection ports.

The optical cross-connect 1504 includes a network management controller (NMC) 1530, the optical switch fabric 1312, N I/O ports 1531A–1531N, M extra I/O ports (I/O port 1532 being an example of one of the M extra I/O ports) for every N I/O ports 1531A–1531N, at least one additional I/O port 1541A–1541M for coupling to at least one network. The at least one additional I/O port 1541A–1541M for coupling to at least one network differs little from the N I/O ports 1531A–1531N but for the connection to the at least one network. In fact one of the N I/O ports 1531A–1531N can be utilized to couple to a network connection when not needed for connection to a client. The M extra I/O ports (I/O port 1532 being an example of one of the M extra I/O ports) for every N I/O ports 1531A–1531N acts as a protection port for the optical cross-connect switch 1504. The N I/O ports 1531A–1531N couple to the N working links 1506. The M extra I/O ports (I/O port 1532 being an example) couple to the protection links or protect connections (such as protect connection 1508). The N I/O ports 1531A–1531N, the M extra I/O ports, and the at least one additional I/O port 1541A–1541M of the optical cross-connect switch 1504 are typically provided by I/O port cards which may be referred to as working port cards, protection port cards, and network port cards respectively.

The N I/O ports 1531A–1531N of the optical cross-connect are also referred to as working ports or client ports because they couple to one or more clients. The at least one additional I/O port 1541A–1541M for coupling to at least one network respectively are also referred to as network port(s) because of their connectivity to a network. The M extra I/O ports (I/O port 1532 being an example of one of the M extra I/O ports) of the optical cross-connect are also referred to as protect ports.

In one embodiment, the NMC 1530 of the optical cross-connect switch 1504 and the NMC 1520 of the client 1502 couple to the signaling channel 1514 using signaling interfaces to transceive connection failure signals. In another embodiment, dedicated signaling lines (such as shown in FIG. 14) may be used between the N I/O ports 1531A–1531N of the optical cross-connect switch 1594 and the N I/O ports 1521A–1521N of the client 1502 to transceive or bi-directionally transport connection failure signals. In yet another embodiment, the working link of the pair of working links without the connection failure coupled between the N I/O ports 1531A–1531N and the N I/O ports 1521A–1521N is used to transceive or bi-directionally transport connection failure signals.

Referring now to FIGS. 16A–16B and 17A–17B, the automatic protection switching (APS) protocol is now described for the possible connection failures. A connection failure can be caused by failure in one of the working links 1506 between the client 1502 and the optical cross-connect switch 1504. Alternatively, a connection failure can be caused by a failure in one of the N I/O ports 1521A–1521N in the client 1502 or one of the N I/O ports 1531A–1531N in the optical cross-connect switch 1504. For simplicity, either of the connection failure mechanisms will be referred to herein as a connection failure or link failure. A connection failure includes signal failure conditions such as a loss of signal (LOS) or signal degrade conditions such as through a bit error rate (BER) threshold crossings or other commonly know optical failure mechanisms.

Referring momentarily back to FIG. 15, for the purposes of illustrating the protection connection 1508, assume that an exemplary communication channel is established between the client 1502 and a network 1550. The optical switch fabric 1312 establishes a pair of optical paths 1551 and 1552 between its port 1531A and 1541B. Thus the optical cross-connect switch 1504 cross-connects signals between I/O port 1531A (also referred to as Port X) and I/O port 1541B (also referred to as Port Y) such that there is a full duplex connection between the client 1502 and the network 1550 over the pair of optical links 1506A and 1506A'. Assume also that the protection connection 1508 is provided between the ports 1522 and 1532 of the client 1502 and the optical cross-connect switch 1504 respectively.

Figure 16A:
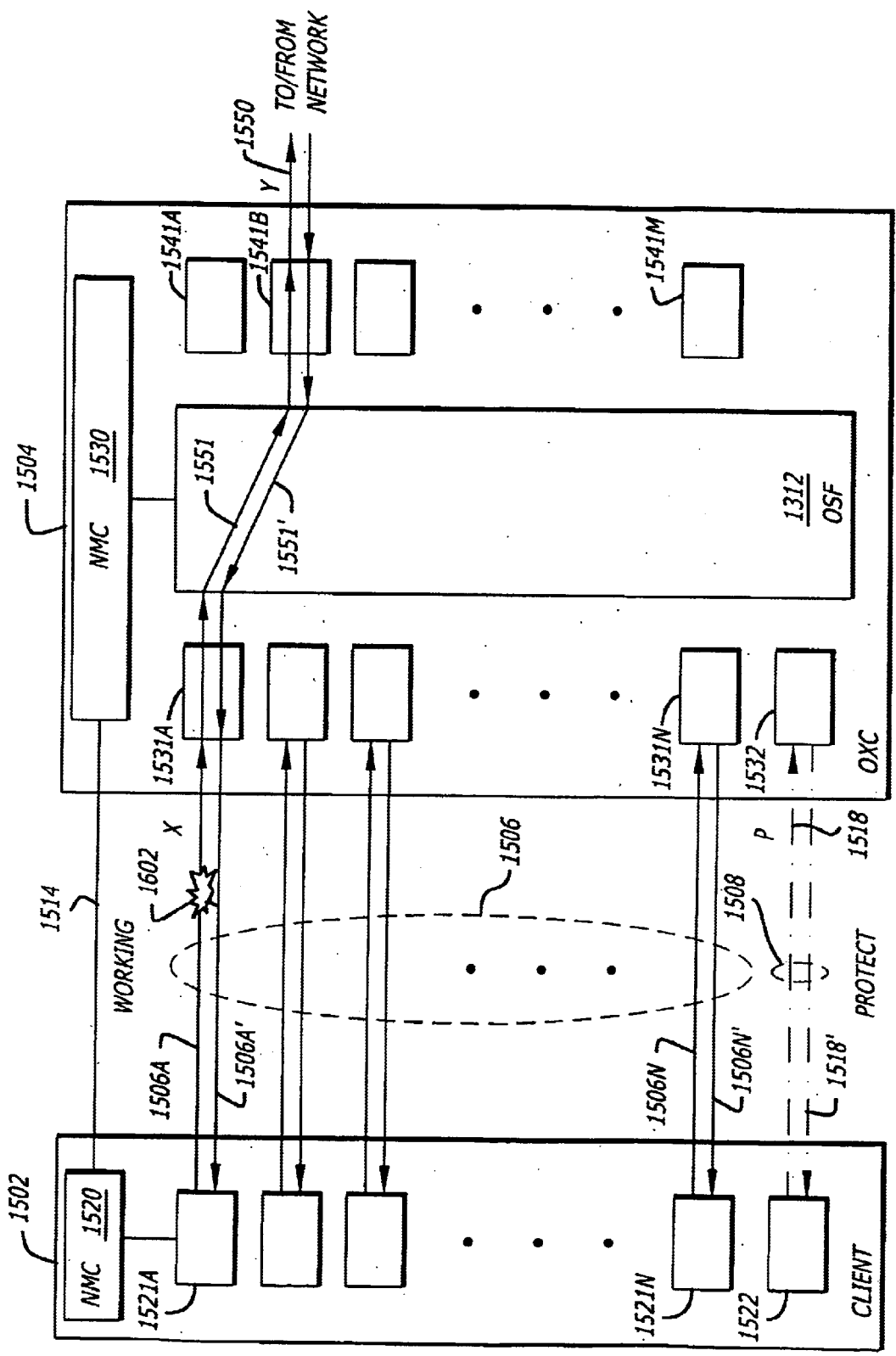
FIG. 16A is a block diagram illustrating a connection failure in a unidirectional link from a client into an optical cross-connect switch with the optical cross-connect signaling to the client to switch to protection.

Referring now to FIG. 16A, a link failure occurs in one of the links 1506 in the optical connection from the client 1504 to the optical cross-connect switch 1504. In FIG. 16A, the link 1506A is illustrated having the link failure 1602 in this case. This may be caused by damage to an optical fiber providing the optical connection or in a component in a port card of the client, such as a transmitter, or a port card of the optical cross-connect switch 1504. For whatever reason, assume that signals from the client 1504 are not cross-connected through the optical cross-connect switch to the network 1550 over the link 1506A.

Assuming link 1506A has the connection failure 1602, port 1531A in the receive side of the optical cross-connect 1504 detects the connection failure due to a lack of an incoming signal with or without using an optical-electrical-optical converter (O/E/O). Port 1531A can detect a signal loss without using an optical-electrical-optical converter (O/E/O) by tapping the optical signal and measuring the signal power or by determining if specific patterns are non-existent in the signal indicating a signal loss. This detection of signal loss can generally be referred to as detecting or sensing a connection failure and may generally be referred to as being performed by a sensor in the N I/O ports 1531A–1531N or N I/O ports 1521A–1521N. Upon detecting a connection failure in one of the links 1506A–1506N, the optical cross-connect switch 1504 needs to signal the client 1502 as to which link has the connection failure.

Various signaling means can be used. A port, itself or through the NMC 1530, can signal from the optical cross-connect switch 1504 to the client equipment 1502 that a connection failure has occurred. The optical cross-connect switch 1504 can use the network 1514 illustrated in FIG. 15 to signal to the client 1502 that a connection failure has occurred in one of the links 1506A–1506N. The network 1514 is referred to as an out-of-band signaling channel and is an Ethernet for example. In an alternate embodiment, the port itself can signal to the respective port of the client equipment that a connection failure has occurred in one of the links 1506A–1506N by terminating the signal propagation in the reverse direction over one of the links 1506A'–1605N'. The respective port in the client equipment detects the termination of the signal propagation as a connection failure in the respective one of the links 1506A'–1506N' and attempts to similarly signal the optical cross-connect switch and then switches to the protection connection 1508. Terminating the signal propagation over the reverse link of the respective link having the connection failure is referred to as an in-band signaling mechanism. Alternatively, a predetermined pattern, indicating signal loss on the link in the opposing direction, can be transmitted on the good link of the pair. Upon detecting the predetermined pattern, it is understood that a signal failure has occurred on the opposite link. In another embodiment dedicated signaling links, electrical or optical such as the optical dedicated signaling links 1404A–1404N previously described, between port cards of the optical cross connect and port cards of the client 1502 can be used to signal a connection failure. In the exemplary case of the connection failure 1602, the port 1531A, itself or through the NMC 1530, signals from the optical cross-connect switch 1504 to the client equipment 1502 that the connection failure 1602 has occurred in link 1506A as illustrated in FIG. 16A.

Figure 16B:
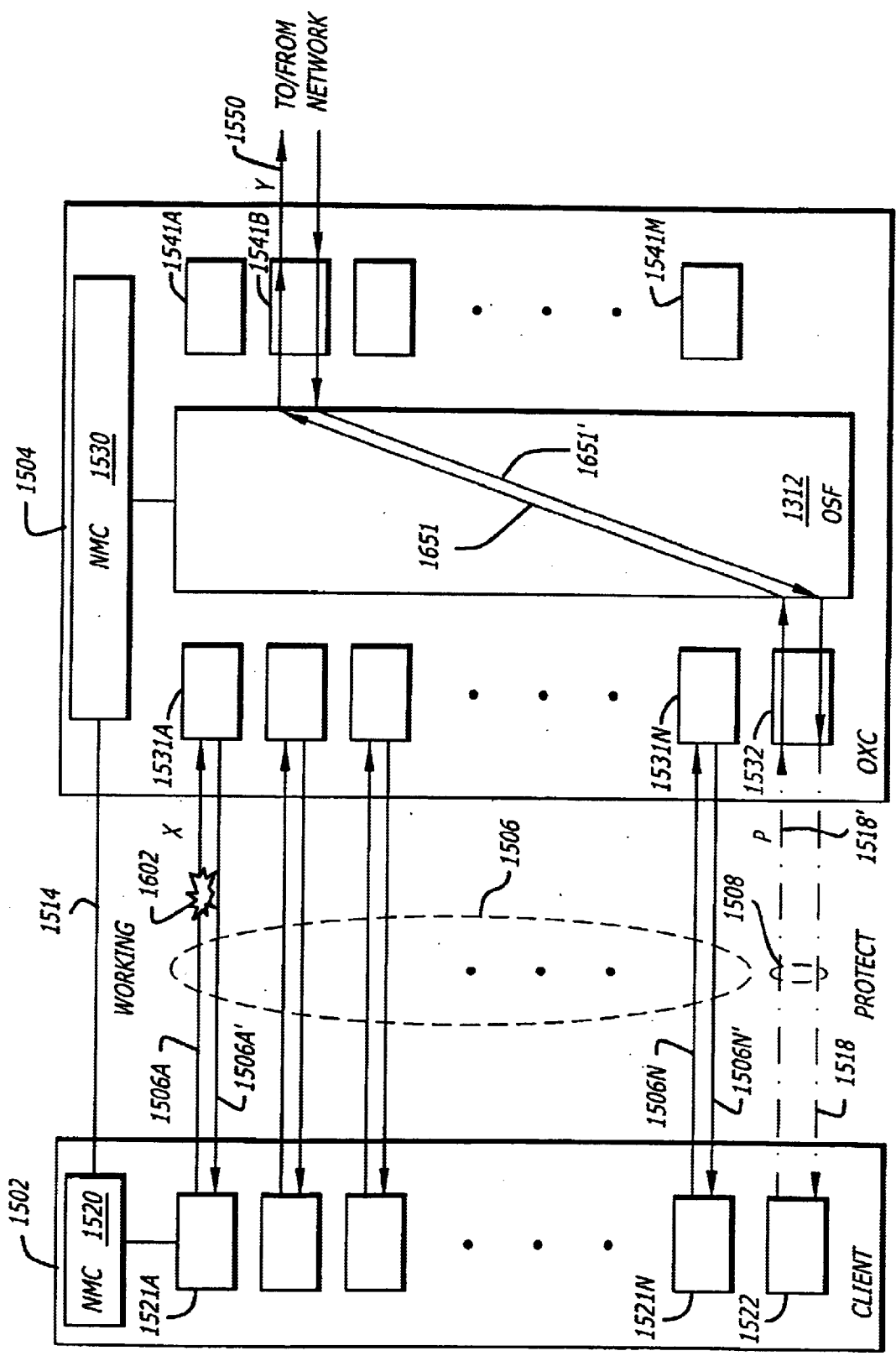
FIG. 16B is a block diagram illustrating the operation of the protection connection between the optical cross-connect switch and the client for the connection failure illustrated in FIG. 16A in order to restore service.

Referring now to FIG. 16B, the optical cross-connect switch 1504 and the client 1502 after being signaled, now know that a connection failure in link 1506A has occurred. The optical cross-connect switch 1504 and the client 1502 each switch from the pair of full duplex links 1506A and 1506A' over to the protection connection 1508 and its pair of full duplex links 1518 and 1518'. The client 1502 internally switches the connection from port 1521A to its protection port 1522. The optical cross-connect 1504 internally switches the connection from port 1531A to its protection port 1532 ending the optical paths 1551 and 1551' and establishing optical paths 1651 and 1651' respectively through the optical switch fabric 1312 between its protection port 1532 and port 1541B.

Referring momentarily back to FIG. 15, for the purposes of illustrating the protection connection 1508 for another connection failure, assume that the exemplary communication channel is established between the client 1502 and a network 1550 as illustrated in FIG. 15. That is, all links are working normally.

Figure 17A:
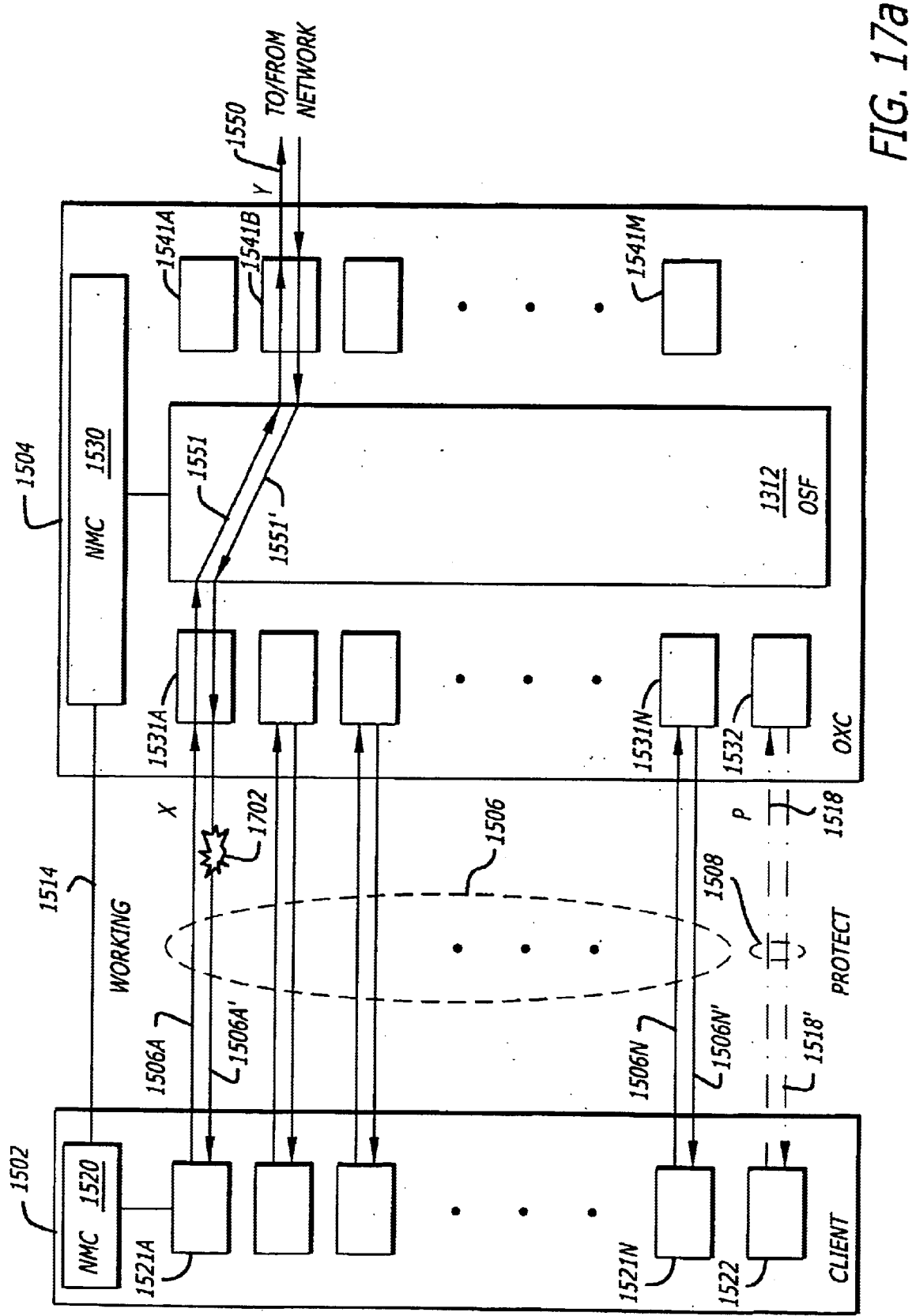
FIG. 17A is a block diagram illustrating a connection failure a unidirectional link from an optical cross-connect switch to a client with the client signaling to the optical cross-connect to switch to protection.

Referring now to FIG. 17A, assume that a link failure occurs in one of the links 1506 in the optical connection from the optical cross-connect switch 1504 to the client 1502. In FIG. 17A, the link 1506A' is illustrated having the link failure 1702 in this case. This may be caused by damage to an optical fiber providing the optical connection or in a component in a port card of the optical cross-connect switch 1504 or the client 1502. Signals at the optical cross-connect switch 1504 that are supposed to be coupled to one of the links 1506A'–1506N' and to the client 1502 do not reach the client 1502 due to some connection failure.

Assuming link 1506A' has a connection failure, port 1521A in the receive side of the client 1502 detects the connection failure due to a lack of an incoming signal with or without using an optical-electrical-optical converter. Port 1521A can detect a signal loss with or without an optical-electrical-optical converter (O/E/O). Upon detecting a connection failure in one of the links 1506A'–1506N', the client 1502 needs to signal the optical cross-connect switch 1504 as to which link the connection failure has occurred on.

The various signaling means previously described can be used but in an alternate direction from the client 1502 to the optical cross-connect switch 1504. In the exemplary case of the connection failure 1702, the port 1521A, itself or through the NMC 1520, signals from the client equipment 1502 to the optical cross-connect switch 1504 that the connection failure 1702 has occurred in link 1506A' as illustrated in FIG. 17A. Using the out-of-band signaling channel, port 1521A signals to the NMC 1520 the connection failure 1702 has occurred on link 1506A'. The NMC 1520 coupled to the network 1514, signals to the NMC 1530 coupled to the network 1514 using the out-of-band signaling channel. Using in-band signaling, the port 1521A signals over the good link 1506A to the port 1531A that the connection failure 1702 has occurred in link 1506A'. The signal over the good link 1506A can be either a predetermined pattern indicating a signal loss on the opposite link or simply a termination of the signals on the link. If signal termination is used, the port 1531A detects the signal termination assuming that a connection failure has occurred and attempts to signal back to the client 1502 and switches to the protection port 1532.

Figure 17B:
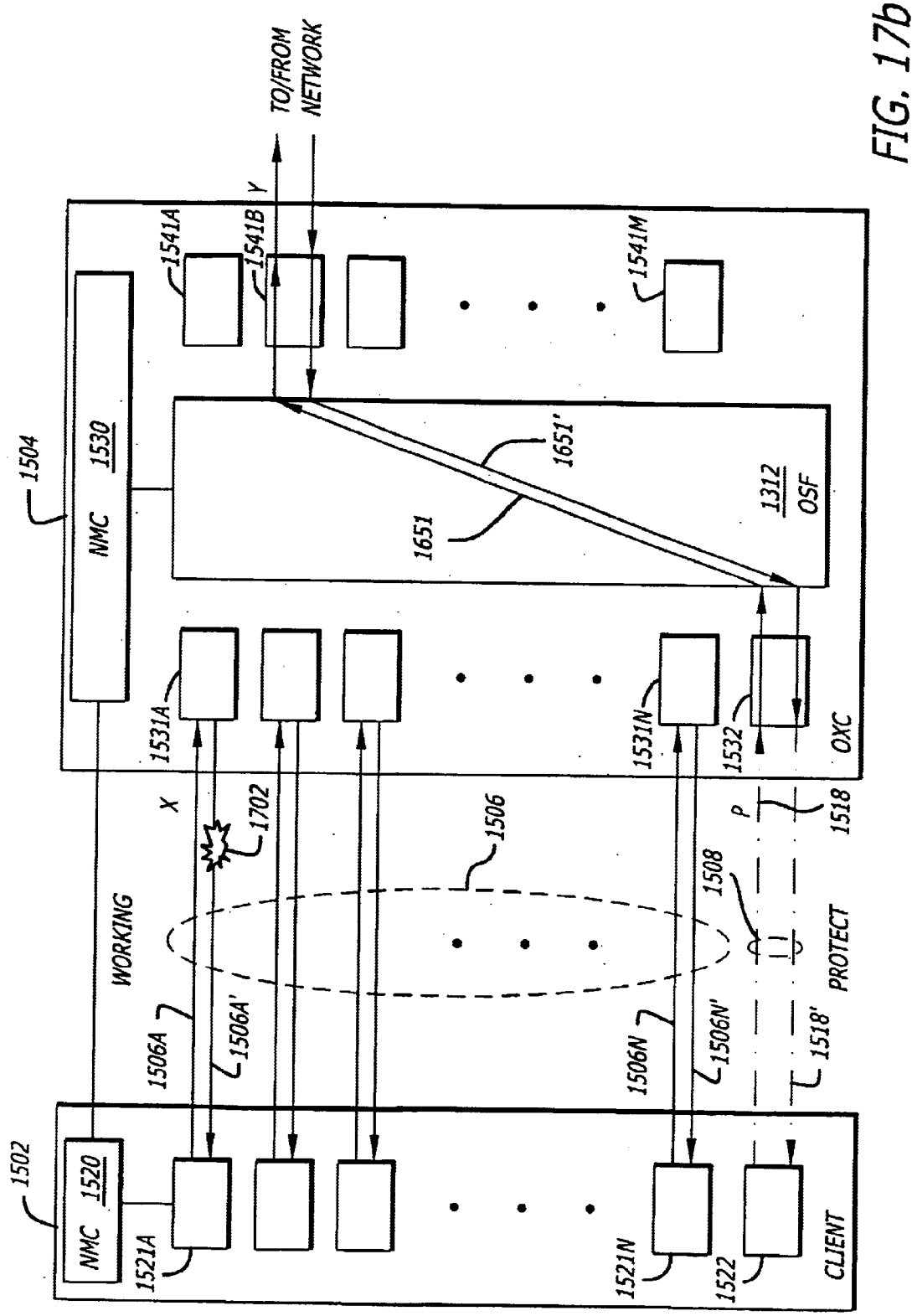
FIG. 17B is a block diagram illustrating the operation of the protection connection between the optical cross-connect switch and the client for the connection failure illustrated in FIG. 17A in order to restore service.

Referring now to FIG. 17B, the client 1502 and the optical cross-connect switch 1504 after being signaled, now know that a connection failure in link 1506A' has occurred. The optical cross-connect switch 1504 and the client 1502 each switch from the pair of full duplex links 1506A and 1506A' over to the protection connection 1508 and its pair of full duplex links 1518 and 1518'. The client 1502 internally switches the connection from port 1521A to its protection port 1522. The optical cross-connect 1504 internally switches the connection from port 1531A to its protection port 1532 ending the optical paths 1551 and 1551' and establishing optical paths 1651 and 1651' respectively through the optical switch fabric 1312 between its protection port 1532 and port 1541B.

Referring back to FIG. 15, connection failures can occur in both respective pair of links between the ports of the client and the optical cross-connect switch. For example, link 1506A can experience the connection failure 1602 while the link 1506A' can experience the connection failure 1702 at the same moment. In this case, the client 1502 detects the connection failure 1602, attempts to signal the optical cross-connect switch 1504 and switches over to the protect port 1522. The optical cross-connect switch 1504 also detects the connection failure 1702, attempts to signal the client 1502, and internally switches the connection from port 1531A to its protection port 1532 ending the optical paths 1551 and 1551' and establishing optical paths 1651 and 1651' respectively through the optical switch fabric 1312 between its protection port 1532 and port 1541B. In this case because both links of the pair have a connection failure, and no signaling is required but attempts can be made to signal between the OXC and the client to accomplish the protection. The client 1502 and the optical cross-connect switch 1504 will assume in this case that a unidirectional cut has occurred in each of their respective links 1506A and 1506A'.

The present invention is thus described and has many advantages over the prior art. One advantage of the present invention is that service interruption is minimized in an optical connection between client equipment and optical cross-connect switches by utilizing the protection mechanism of the present invention. Another advantage of the present invention is that minimal change need be made to client equipment and an optical cross-connect switch in order to support the protection connection. Still another advantage of the present invention is that the network protection provided by the present invention is independent of other protection that may be provided in the network such as by the equipment itself or other network protection mechanisms.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the optical cross-connect switch has been described and illustrated as coupling to one client and one network but can just as well couple to multiple clients and multiple networks and provide connection protection for optical connections between the multiple clients and optical network equipment. Furthermore, the connection protection can be provided for optical connections between other types of optical networking equipment and not just client equipment and optical cross-connect switches. Additionally, it is possible to implement the present invention or some of its features in hardware, firmware, software or a combination thereof where the software is provided in a processor readable storage medium such as a magnetic, optical, or semiconductor storage medium.

What is claimed is:

1. A connection protection mechanism for an optical cross-connect switch, the connection protection mechanism comprising:

the optical cross-connect switch to couple to client equipment, the optical cross-connect switch to bi-directionally transport optical signals with the client equipment, the optical cross-connect switch including one or more working ports to couple to the client equipment, each of the one or more working ports to couple to the client equipment using a pair of working links, and a protection port to couple to the client equipment using a pair of protection links; and a signaling channel to transport a connection failure signal indicating if one working port of the one or more working ports has a connection failure in its working link or the one working port coupling to the client equipment.

2. The connection protection mechanism of claim 1 wherein, if the one working port of the one or more working ports has the connection failure, the optical cross-connect switch to switch the coupling to the client equipment from the one working port to the protection port.

3. The connection protection mechanism of claim 1 wherein, the optical cross-connect switch is without an optical-electrical-optical converter (O/E/O) but has a sensor to detect the connection failure.

4. The connection protection mechanism of claim 1 wherein, the client equipment includes one or more of the set of wavelength division multiplexed (WDM) line terminals, SONET add/drop multiplexers, internet protocol (IP) routers, additional optical cross-connect switches and Asynchronous Transfer Mode (ATM) switches.

5. The connection protection mechanism of claim 1 wherein,
the optical cross-connect switch further includes
at least one network port to couple to a network to bi-directionally transport optical signals with the network.

6. The connection protection mechanism of claim 5 wherein,
the optical cross-connect switch further includes
a first optical switch fabric of optical switches to connect at least one pair of optical signals between the network equipment and the client equipment.

7. The connection protection mechanism of claim 1 wherein,
the optical cross-connect switch further includes a first optical switch fabric, and
if the one working port of the one or more working ports has the connection failure, the first optical switch fabric to switch the coupling to the client equipment through the one working port to the protection port.

8. The connection protection mechanism of claim 1 wherein,
the signaling channel is an out-of-band signaling channel.

9. The connection protection mechanism, of claim 8 wherein,
the out-of-band signaling channel is a communication channel over a network.

10. The connection protection mechanism of claim 9 wherein,
the optical cross-connect switch further includes
a network management controller to couple to a network and the one or more working ports and the protection port, the network management controller to transmit and to receive connection failure signals over the signaling channel regarding the working links between the optical cross-connect switch and the client equipment.

11. The connection protection mechanism of claim 9 wherein,
the network is a local area network, a metropolitan network, a wide area network, an internet, or an intranet.

12. The connection protection mechanism of claim 1 wherein,
the signaling channel is an in-band signaling channel.

13. The connection protection mechanism of claim 12 wherein,
the in-band signaling channel is the working link without the connection failure of the pair of working links having the connection failure.

14. The connection protection mechanism of claim 12 wherein,
the in-band signaling channel is a dedicated signaling link in parallel with each of the pair of working links.

15. The connection protection mechanism of claim 6 wherein,
the optical cross-connect switch further includes
a second optical switch fabric of optical switches to provide a redundant optical switch fabric in case of a failure in the first optical switch fabric, and
wherein if the one working port of the one or more working ports has the connection failure, the second optical switch fabric to switch the coupling to the client equipment through the one working port to the protection port.

16. The connection protection mechanism of claim 1 wherein,
the optical cross-connect switch further includes
a second protection port to couple to the client equipment using a second pair of protection links and,
wherein if the one working port of the one or more working ports has the connection failure, the optical cross-connect switch to switch the coupling to the client equipment from the one working port to the second protection port.

17. The connection protection mechanism of claim 6 wherein,
the optical switches or the optical switch fabric are micro-machined mirrors to direct optical signals between the client and the network.

18. A method for protecting connections between an optical cross-connect switch and a client, the method comprising:
detecting a connection failure on a working link of a pair of working links between the optical cross-connect switch and the client;
signaling the optical cross-connect switch or the client of the connection failure in response to detecting the connection failure; and
switching to a pair of protection links between the optical cross-connect switch and the client from the pair of working links having the connection failure.

19. The method of claim 18 wherein,
the optical cross-connect switch is without an optical-electrical-optical converter (O/E/O) but has a sensor to detect the connection failure.

20. The method of claim 18 wherein,
the client includes one or more of the set of wavelength division multiplexed (WDM) line terminals, SONET add/drop multiplexers, internet protocol (IP) routers, additional optical cross-connect switches and Asynchronous Transfer Mode (ATM) switches.

21. The method of claim 18 further comprising:
providing a signaling channel between the optical cross-connect switch and the client; and wherein the signaling includes
transmitting a connection failure signal over the signaling channel to the optical cross-connect switch or the client in response to detecting the connection failure.

22. The method of claim 21 wherein,
the signaling channel is an out-of-band signaling channel.

23. The method of claim 18 further comprising:
cross-connecting optical signals between the client and a communication network using micro-machined mirrors.

24. The method of claim 18 wherein,
the connection failure is detected by the optical cross-connect switch in the working link from the client to the optical cross-connect switch, and the optical cross-connect switch signals the connection failure to the client by
disabling optical signal propagation from the optical cross-connect switch to the client over the working link without the connection failure of the pair of working links with the connection failure.

25. The method of claim 18 wherein,
the connection failure is detected by the optical cross-connect switch in the working link from the client to the optical cross-connect switch, and the optical cross-connect switch signals the connection failure to the client by transmitting an optical signal having a pattern over the working link from the optical cross-connect switch to the client without the connection failure, the pattern indicating the connection failure in the working link from the client to the optical cross-connect switch.

26. The method of claim 25 wherein, the signaling channel is an in-band signaling channel.

27. The method of claim 18 wherein, the connection failure is detected by the client in the working link from the optical cross-connect switch to the client, and the client signals the connection failure to the optical cross-connect switch by disabling optical signal propagation from the client to the optical cross-connect switch over the working link from the client to the optical cross-connect switch without the connection failure of the pair of working links with the connection failure.

28. The method of claim 18 wherein, the connection failure is detected by the client in the working link from the optical cross-connect switch to the client, and the client signals the connection failure to the optical cross-connect switch by transmitting an optical signal having a pattern over the working link from the client to the optical cross-connect switch without the connection failure, the pattern indicating the connection failure in the working link from the optical cross-connect switch to the client.

29. A connection protection interface for an optical cross-connect switch, the connection protection interface comprising:

one or more I/O port cards in the optical cross-connect switch, each of the one or more I/O port cards to couple to a client equipment using working optical links; and M protection port cards for every N I/O port cards of the one or more I/O port cards, the M protection port cards to couple to the client equipment using protection optical links.

30. The connection protection interface of claim 29 wherein, the protection port cards to bi-directionally transport optical signals with the client equipment over the protection optical links in the event of a connection failure in a working link in one of the one or more I/O port cards.

31. The connection protection interface of claim 29 wherein, each of the working optical links is a pair of optical fiber and each of the protection optical links is a pair of optical fibers.

32. The connection protection interface of claim 29 wherein, each of the working optical links is a single optical fiber and each of the protection optical links is a single optical fiber.

33. The connection protection interface of claim 29 wherein,

M is greater than or equal to one and N is greater than or equal to one.

34. The connection protection interface of claim 29 wherein, each of the one or more I/O port cards of the optical cross-connect switch is without an optical-electrical optical converter (O/E/O) but each has a sensor to detect the connection failure between the client equipment and the optical cross-connect switch.

35. The connection protection interface of claim 29 wherein, the client equipment includes one or more of the set of wavelength division multiplexed (WDM) line terminals, SONET add/drop multiplexers, internet protocol (IP) routers, additional optical cross-connect switches and Asynchronous Transfer Mode (ATM) switches.

36. The connection protection interface of claim 29 wherein, the one or more I/O port cards to communicate with the client equipment are client port cards.

37. The connection protection interface of claim 29 wherein, at least one I/O port card to communicate with a network and is a network port card.

38. The connection protection interface of claim 29 wherein, each of the one or more I/O port cards further has a dedicated signal line to couple to a respective I/O port card of the client equipment, the dedicated signal line to transmit and receive connection failure signals regarding the connection between the optical cross-connect switch and the client equipment.

39. The connection protection interface of claim 29 further comprising:

an out of band signaling channel to transmit a connection failure signal in response to the sensor detecting a connection failure in a working link from the client equipment to the optical cross-connect switch.

40. The connection protection interface of claim 39 wherein, the connection failure signal indicates the connection failure and which of the one or more I/O port cards has the connection failure.

41. The connection protection interface of claim 29 wherein, the connection failure is detected by the optical cross-connect switch in a working link from the client equipment to the optical cross-connect switch, and the optical cross-connect switch signals the connection failure to the client equipment by disabling optical signal propagation from the optical cross-connect switch to the client equipment over the working link without the connection failure of the one I/O port card of the one or more I/O port cards with the connection failure.

42. The connection protection interface of claim 29 wherein, the connection failure is detected by the optical cross-connect switch in a working link from the client equipment to the optical cross-connect switch, and the optical cross-connect switch signals the connection failure to the client equipment by transmitting an optical signal having a pattern over the working link without the connection failure of the one I/O port card of the one or more I/O port cards with the connection failure, the optical signal having the pattern indicating the connection failure in the working link from the client to the optical cross-connect switch.

43. The connection protection interface of claim 42 wherein, the pattern of the optical signal indicates the connection failure and which of the one or more I/O port cards has the connection failure.

44. A protected connection between an optical cross-connect switch and a client equipment in a communication network system, the protected connection comprising:

one or more pairs of optical links coupled between the optical cross-connect switch and the client equipment as working links over which optical signals ordinarily propagate without a connection failure; and at least one pair of optical links coupled between the optical cross-connect switch and the client equipment as protection links over which optical signals can atypically propagate in the event of a connection failure.

45. The protected connection of claim 44 wherein, the optical cross-connect switch includes, one or more input/output (I/O) ports coupled to the one or more pairs of optical links as the working links to connect and bi-directionally transport optical signals with the client equipment, and at least one protection port to couple to the at least one pair of optical links as the protection links to connect with the client equipment and atypically bi-directionally transport optical signals with the client equipment in the event of a connection failure in the working links of the one or more pairs of optical links; and the client equipment includes, one or more I/O ports coupled to the one or more pairs of optical links as the working links to connect and bi-directionally transport optical signals with the optical cross-connect switch, each of the one or more I/O ports having a sensor to detect a connection failure between the client equipment and the optical cross-connect switch, and at least one protection port to couple to the at least one pair of optical links as the protection links to connect with the optical cross-connect switch and atypically bi-directionally transport optical signals with the optical cross-connect switch in the event of a connection failure in the working links of the one or more pairs of optical links.

46. The protected connection of claim 45 wherein, the one or more I/O ports of the optical cross-connect switch are without an optical-electrical-optical converter (O/E/O) but each has a sensor to detect a connection failure between the client equipment and the optical cross-connect switch.

47. The protected connection of claim 44 wherein, the client equipment includes one or more of the set of wavelength division multiplexed (WDM) line terminals, SONET add/drop multiplexers, internet protocol (IP) routers, additional optical cross-connect switches and Asynchronous Transfer Mode (ATM) switches.

48. The protected connection of claim 44 further comprising:

an out-of-band signaling channel between the client equipment and the optical cross-connect switch, the out-of-band signaling channel to transmit a connection failure signal in response to detection of a connection failure in the working links between the client equipment and the optical cross-connect switch.

49. The protected connection of claim 48 wherein, the out-of-band signaling channel is a communication channel of a network.

50. The protected connection of claim 48 wherein, the connection failure signal indicates the connection failure and which of the one or more I/O ports of the client equipment and the optical cross-connect switch has the connection failure.

51. The protected connection of claim 44 further comprising:

one or more in-band signaling channels between the client equipment and the optical cross-connect switch, the one or more in-band signaling channels to transmit a connection failure signal in response to detection of a connection failure in the working links between the client equipment and the optical cross-connect switch.

52. The protected connection of claim 51 wherein, the connection failure signal indicates the connection failure and which of the one or more I/O ports of the client equipment and the optical cross-connect switch has the connection failure.

53. The protected connection of claim 51 wherein, the one or more in-band signaling channels between the client equipment and the optical cross-connect switch are one or more dedicated signal lines coupled between the respective one or more I/O ports of the client equipment and the optical cross-connect switch, the one or more dedicated signal lines to transmit and receive connection failure signals regarding the connection between the optical cross-connect switch and the client equipment.

54. The protected connection of claim 51 wherein, the one or more in-band signaling channels between the client equipment and the optical cross-connect switch are the optical links without the connection failure of the one or more pairs of optical links of the working links having the connection failure, the optical links without the connection failure to propagate connection failure signals regarding the connection between the optical cross-connect switch and the client equipment.

55. The protected connection of claim 51 wherein, the connection failure is detected by an I/O port of the optical cross-connect switch in an optical link of a pair of optical links and the optical cross-connect switch signals the connection failure to the client equipment by disabling optical signal transport from the optical cross-connect switch to the client equipment over another optical link without the connection failure of the pair of optical links.

56. The protected connection of claim 51 wherein, the connection failure is detected by an I/O port of the optical cross-connect switch in an optical link of a pair of optical links and the optical cross-connect switch signals the connection failure to the client equipment by transmitting an optical signal having a pattern over another optical link without the connection failure of the pair of optical links, the optical signal having the pattern indicating the connection failure in the optical link.

57. The protected connection of claim 51 wherein, the connection failure is detected by an I/O port of the client equipment in an optical link of a pair of optical links and the client equipment signals the connection failure to the optical cross-connect switch by disabling optical signal transport from the client equipment to the optical cross-connect switch over another optical link without the connection failure of the pair of optical links.

58. The protected connection of claim 51 wherein, the connection failure is detected by an I/O port of the client equipment in an optical link of a pair of optical links and the client equipment signals the connection failure to the optical cross-connect switch by transmitting an optical signal having a pattern over another optical link without the connection failure of the pair of optical links, the optical signal having the pattern indicating the connection failure in the optical link.

59. A connection protection mechanism for optical network equipment, the connection protection mechanism comprising:

the optical network equipment to couple to client equipment, the optical network equipment to bi-directionally transport optical signals with the client equipment, the optical network equipment including one or more working ports to couple to the client equipment, each of the one or more working ports to couple to the client equipment using a pair of working links, and a protection port to couple to the client equipment using a pair of protection links; and a signaling channel to transmit and receive a connection failure signal indicating if one working port of the one or more working ports has a connection failure in a working link or a working port coupling to the client equipment.

60. The connection protection mechanism of claim 59 wherein, if the one working port of the one or more working ports has the connection failure, the optical network equipment to switch the coupling to the client equipment from the one working port to the protection port.

* * * * *